US011958001B2

(12) United States Patent
Fleming et al.

(10) Patent No.: US 11,958,001 B2
(45) Date of Patent: Apr. 16, 2024

(54) METHOD AND SYSTEM FOR ORIFICE CONTROL OF VALVE PRESSURE DROP

(71) Applicant: SULZER MANAGEMENT AG, Winterthur (CH)

(72) Inventors: Phillip Bradley Fleming, Keller, TX (US); Larry W. Burton, Waxahachie, TX (US); Michael J. Binkley, Glenn Heights, TX (US)

(73) Assignee: SULZER MANAGEMENT AG, Winterthur (CH)

( * ) Notice: Subject to any disclaimer, the term of this patent is extended or adjusted under 35 U.S.C. 154(b) by 59 days.

(21) Appl. No.: 15/881,204

(22) Filed: Jan. 26, 2018

(65) Prior Publication Data

US 2018/0147504 A1 May 31, 2018

Related U.S. Application Data

(63) Continuation-in-part of application No. 14/822,637, filed on Aug. 10, 2015, now abandoned.

(60) Provisional application No. 62/484,688, filed on Apr. 12, 2017, provisional application No. 62/451,400, filed on Jan. 27, 2017, provisional application No. 62/035,856, filed on Aug. 11, 2014.

(51) Int. Cl.
*B01D 3/16* (2006.01)
*B01D 3/26* (2006.01)
*B01D 3/32* (2006.01)
*B01F 23/234* (2022.01)
*F16K 24/04* (2006.01)

(52) U.S. Cl.
CPC ............. *B01D 3/163* (2013.01); *B01D 3/26* (2013.01); *B01D 3/326* (2013.01); *B01F 23/23412* (2022.01); *F16K 24/04* (2013.01)

(58) Field of Classification Search
CPC .......... B01D 3/163; B01D 3/326; B01D 3/26; B01F 3/04751; F16K 24/04
See application file for complete search history.

(56) References Cited

U.S. PATENT DOCUMENTS 2,710,177 A 6/1955 Young et al.
2,772,080 A * 11/1956 Huggins ................ B01D 3/163
  261/114.3
2,819,050 A 1/1958 Huggins et al.
(Continued)

FOREIGN PATENT DOCUMENTS

BE 588 502 A 7/1960
WO 2011/141301 A2 11/2011
WO WO-2016/051372 A1 4/2016

OTHER PUBLICATIONS

Lockett, M.J., Distillation Tray Fundamentals, Cambridge University Press, 1986.
(Continued)

*Primary Examiner* — Stephen Hobson
(74) *Attorney, Agent, or Firm* — GLOBAL IP COUNSELORS, LLP

(57) ABSTRACT

The present disclosure relates to a valve tray for use in a chemical process column. The valve tray includes a plurality of apertures formed therein. A plurality of valves are maintained in a spaced relationship relative to individual apertures of the plurality of apertures. An area of the individual apertures is less than an area of individual valves of the plurality of valves.

9 Claims, 20 Drawing Sheets

(56) References Cited

U.S. PATENT DOCUMENTS

| | | | |
|---|---|---|---|
| 2,979,316 A | 4/1961 | Houston, Jr. | |
| 3,037,754 A * | 6/1962 | Glitsch | F16K 15/02 |
| | | | 261/114.4 |
| 3,080,155 A | 3/1963 | Glitsch et al. | |
| 3,087,711 A * | 4/1963 | Glitsch | B01D 3/163 |
| | | | 261/114.3 |
| 3,215,414 A | 11/1965 | Sant | |
| 3,333,836 A * | 8/1967 | Henri | B01D 3/163 |
| | | | 137/513.5 |
| 3,862,281 A * | 1/1975 | Uchiyama | B01D 3/163 |
| | | | 137/512.1 |
| 4,105,723 A | 8/1978 | Mix | |
| 8,876,088 B1 | 11/2014 | Binkley | |
| 9,072,986 B2 | 7/2015 | Kim et al. | |
| 9,586,160 B2 | 3/2017 | Binkley | |
| 9,597,650 B2 | 3/2017 | Buttridge et al. | |
| 2005/0280169 A1 | 12/2005 | Yao et al. | |
| 2011/0278745 A1 | 11/2011 | Pilling et al. | |
| 2013/0062793 A1 | 3/2013 | Pilling et al. | |
| 2016/0193542 A1 | 7/2016 | Buttridge et al. | |
| 2017/0007971 A1 | 1/2017 | Nieuwoudt et al. | |

OTHER PUBLICATIONS

Extended European Search Report dated Feb. 2, 2021 in corresponding European Patent Application No. 18744141.5.
Non-Final Office Action issued in corresponding U.S. Appl. No. 17/327,971.

* cited by examiner

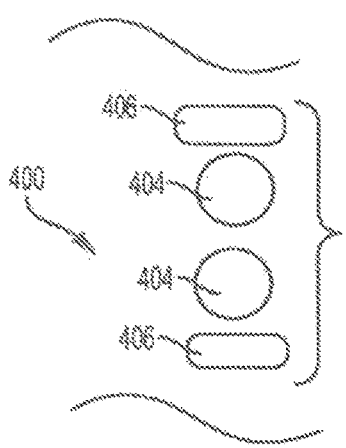 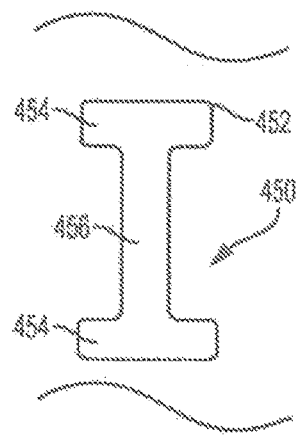 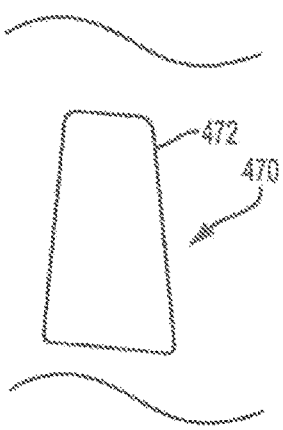
FIG. 4A    FIG. 4B    FIG. 4C
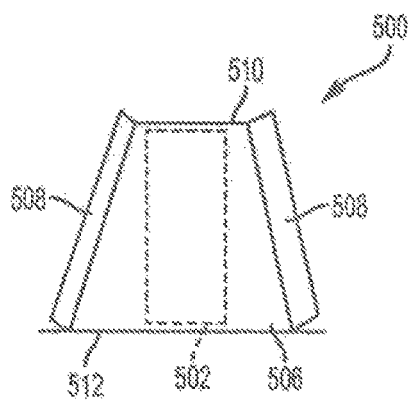
FIG. 5
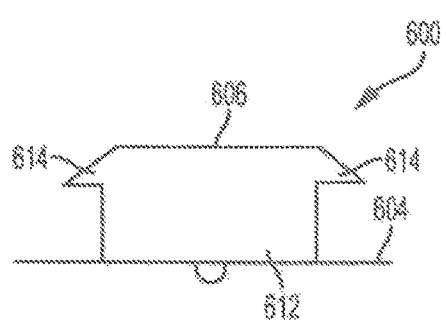
FIG. 6

METHOD AND SYSTEM FOR ORIFICE CONTROL OF VALVE PRESSURE DROP

CROSS-REFERENCE TO RELATED APPLICATIONS

This application is a continuation-in-part of U.S. patent application Ser. No. 14/822,637, filed on Aug. 10, 2015. U.S. patent application Ser. No. 14/822,637 claims priority to U.S. Provisional Patent Application No. 62/035,856, filed on Aug. 11, 2014. This Application claims priority to U.S. Provisional Patent Application No. 62/451,400, filed on Jan. 27, 2017 and U.S. Provisional Patent Application No. 62/484,688, filed on Apr. 12, 2017. U.S. patent application Ser. No. 14/822,637, U.S. Provisional Patent Application No. 62/035,856, U.S. Provisional Patent Application No. 62/451,400, and U.S. Provisional Patent Application No. 62/484,688 are each incorporated herein by reference.

BACKGROUND

Technical Field

The present disclosure relates to fluid-fluid contacting trays and, more particularly, but not by way of limitation, to an improved fluid dispersion device and tray assembly incorporating fixed and/or floating valves including "snap-in" field replacement valve configurations for use in conjunction with an array of tray deck orifices of having a selectively reduced size.

History of the Related Art

This section provides background information to facilitate a better understanding of the various aspects of the disclosure. It should be understood that the statements in this section of this document are to be read in this light, and not as admissions of prior art.

It is well known to utilize distillation columns to separate selected components from a multicomponent stream. Generally, such contact columns utilize either trays, packing, or combinations thereof. Successful fractionation in the column is dependent upon intimate contact between heavier fluids and lighter fluids. Some contact devices, such as trays, are characterized by relatively high pressure drop and relatively high fluid hold-up. One type of contact apparatus utilizes fluid in the vapor phase to contact fluid in the liquid phase and has become popular for certain applications. Another type of contact apparatus is high-efficiency packing, which is energy efficient because it has low pressure drop and low fluid hold-up. However, these very properties at times make columns equipped with structured packing difficult to operate in a stable, consistent manner. Moreover, many applications simply require the use of trays.

Trays for fractionation columns are commonly designed in two general configurations: cross-flow and counter flow. Trays generally consist of a solid tray or deck having a plurality of apertures and are installed on support rings within the column. In cross-flow trays, lighter fluid ascends through the apertures and contacts heavier fluid moving across the tray, through the "active" area thereof. In this area, the heavier fluid and the lighter fluid mix and fractionation occurs. The heavier fluid is directed onto the tray by means of a vertical channel from the tray above. This channel is referred to as the Inlet Downcomer. The heavier fluid moves across the tray and exits through a similar channel referred to as the Exit Downcomer. The location of the downcomers determines the flow pattern of the heavier fluid. If there are two Inlet Downcomers and the heavier fluid is split into two streams over each tray, it is called a two pass tray. If there is only one Inlet and one Outlet Downcomer on opposite sides of the tray, it is called a single pass tray. For two or more passes, the tray is often referred to as a Multipass Tray. The number of passes generally increases as the required (design) flow rate increases. It is the active area of the tray, however, which is of concern.

Addressing now select flow designs, it has been found that a particularly effective tray in process columns is the sieve tray. This type of tray is constructed with a large number of apertures formed in the bottom surface, permitting the ascending lighter fluid to flow into direct engagement with the heavier fluid that is flowing across the tray from the downcomer described above. When there is sufficient lighter-fluid flow upwardly through the tray, the heavier fluid is prevented from running downwardly through the apertures (referred to as "weeping"). A small degree of weeping is normal in trays while a larger degree of weeping is detrimental to the capacity and efficiency of a tray.

Tray efficiency is also known to be improved in sieve type trays by increasing the froth height of the heavier fluid and reducing the backflow of the heavier fluid flowing across the tray. Froth is created when lighter fluid "bubbles" percolate upwardly through the heavier fluid flowing across the tray. The suspension of the lighter fluid in the heavier fluid prolongs the fluid-fluid contact which enhances the efficiency of the process. The longer the froth is maintained and the higher the froth is established, the greater the fluid-fluid retention. Higher froth requires smaller "bubbles" formed at a sufficiently slow rate. Likewise, backflow occurs beneath the froth when circulating currents of heavier fluid are established during the heavier fluid flow across the tray. This generally forms along the lateral portions thereof. These currents carry the heavier fluid back across the tray in a manner that reduces the concentration-difference driving force for mass transfer. It is the concentration-difference between the lighter fluid and the heavier fluid which enhances the effectiveness of the fluid-fluid contact.

The concentration-difference between the lighter fluid and the heavier fluid can be effected in many ways; some reducing efficiency. For example, as operating pressure increases, the heavier fluid begins to absorb lighter fluid as it moves across a tray. This is above that normally dissolved in the heavier fluid and represents much larger amounts of lighter-fluid bubbles that are commingled or "entrained" with the heavier fluid. This lighter fluid is not firmly held and is released within the downcomer, and, in fact, the majority of said lighter fluid must be released otherwise the downcomer cannot accommodate the heavier fluid/lighter fluid mixture and will flood, thus preventing successful tower operation. This phenomena is generally deemed to occur when operating pressure is such as to produce a lighter fluid density above about 1.0 lbs/cu. ft. and typically amounts to about 10 to 20% of the lighter fluid by volume. For conventional trays, as shown below, the released lighter fluid must oppose the descending frothy lighter fluid/heavier fluid mixture flowing over the weir into the downcomer. In many cases, such opposition leads to poor tower operation and premature flooding.

SUMMARY

The present disclosure relates to fluid-fluid contacting trays and, more particularly, but not by way of limitation, to an improved fluid dispersion device and tray assembly incorporating fixed and/or floating units used in conjunction with a tray orifice or aperture of a selectively reduced size. In one aspect, the disclosure relates to a valve tray for use in a chemical-process column. The valve tray includes a tray surface having an aperture formed therein. The aperture is of an aperture area. A retaining cage is disposed on the tray surface proximate the aperture. The retaining cage includes an upper portion and a leg extending downwardly from the upper portion and coupled to the tray surface proximate the aperture. A valve cover is disposed in the retaining cage. The valve cover includes a top surface having a surface area and at least one vane formed on an edge of the top surface. The at least one vane is directed outwardly and downwardly relative to the top surface. The aperture area is smaller than the surface area.

In another aspect, the disclosure relates to a valve. The valve includes a retaining cage disposed on a tray surface proximate the aperture. The retaining cage includes an upper portion and a leg extending downwardly from the upper portion. A valve cover is disposed in the retaining cage. The valve cover includes a top surface having a surface area and at least one vane formed on an edge of the top surface. The at least one vane is directed outwardly and downwardly relative to the top surface.

In another aspect, the disclosure relates to a method of forming a valve tray for use in a chemical-process column. The method includes forming a tray surface having an aperture formed therein. The aperture is of an aperture area. A valve cover is placed on the tray surface over the aperture. The valve cover includes a central portion having a surface area. The aperture area is smaller than the surface area. A retaining cage is placed on the tray surface over the valve cover. The retaining cage is secured to the tray surface.

This summary is provided to introduce a selection of concepts that are further described below in the detailed description. This summary is not intended to identify key or essential features of the claimed subject matter, nor is it to be used as an aid in limiting the scope of the claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 4A is a top view of a tray orifice having a plurality of apertures according to an illustrative embodiment;

FIG. 4B is a top view of a tray orifice having restricted central portion according to an illustrative embodiment;

FIG. 4C is a top view of a trapezoidal tray orifice according to an illustrative embodiment;

FIG. 5 is a top view of a fixed valve according to an illustrative embodiment;

FIG. 6 is an end view of the valve of FIG. 5 according to an illustrative embodiment;

DETAILED DESCRIPTION

Various embodiments will now be described more fully with reference to the accompanying drawings. The disclosure may, however, be embodied in many different forms and should not be construed as limited to the embodiments set forth herein.

Figure 1:
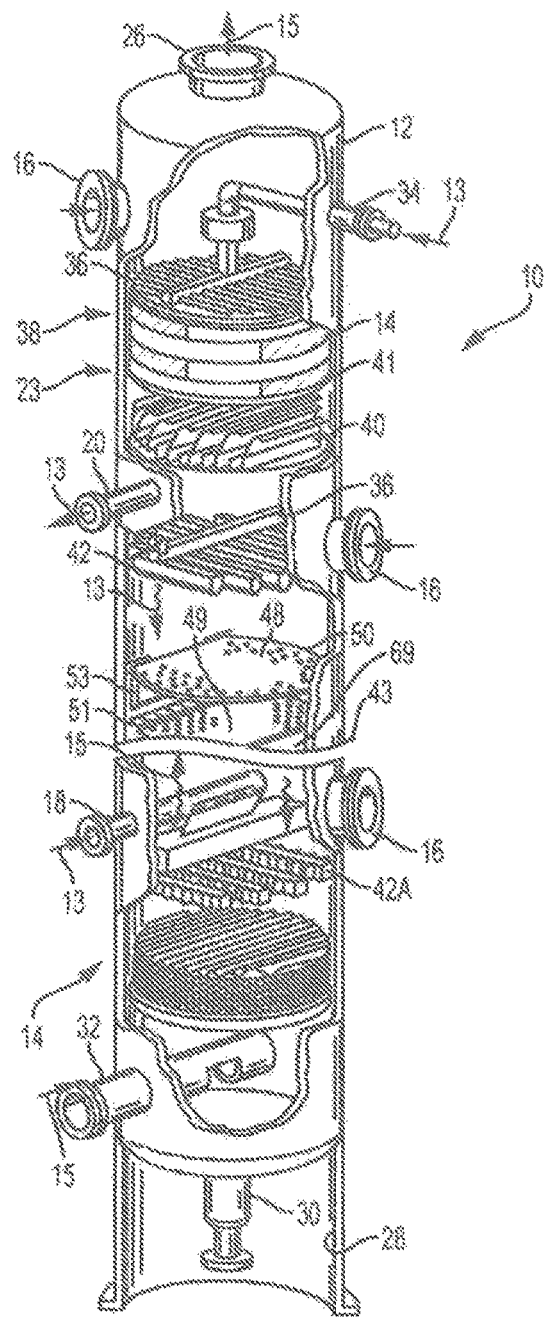
FIG. 1 is a perspective view of a packed column with various sections cut away for illustrating, diagrammatically, a variety of tower in accordance with an illustrative embodiment.

Referring first to FIG. 1, there is shown a fragmentary, perspective view of an illustrative packed exchange tower or column with various sections cut away for showing a variety of tower internals and the utilization of one embodiment of an improved high-capacity tray assembly. The exchange column 10 of FIG. 1 comprises a cylindrical tower 12 having a plurality of packing bed layers 14 and trays disposed therein. A plurality of manways 16 is likewise constructed for facilitating access to the internal region of the tower 12. Also provided are side stream draw-off line 20, heavier-fluid side feed line 18, and side stream lighter-fluid feed line or reboiler return line 32. A reflux return line 34 is provided atop the column 10.

In operation, heavier fluid 13 is fed into the column 10 through reflux return line 34 and side stream feed-input feed line 18. The heavier fluid 13 flows downwardly through the tower and ultimately leaves the tower either at side stream draw-off line 20, or at bottom-stream draw-off line 30. In the case of a vapor-liquid tower, the heavier fluid 13, during its downward flow, is depleted of some material which evaporate from it as it passes through the trays and packing beds, and is enriched or added to by material which condenses into it out of the lighter fluid stream.

Still referring to FIG. 1, the exchange column 10 is shown diagrammatically cut in half for purposes of clarity. In this illustration, the column 10 includes a lighter-fluid outlet in overhead line 26 disposed atop the tower 12 and a lower skirt 28 disposed in the lower region of the tower 12 around bottom stream takeoff line 30 coupled to a reboiler (not shown). Reboiler return conduit 32 is shown disposed above the skirt 28 for recycling lighter fluid 15 therein upwardly through the trays and/or packing layers 14. Reflux from condensers is provided in the upper tower region 23 through entry conduit 34 wherein reflux is distributed throughout a distributor 36 across upper packing bed 38. It may be seen that the upper packing bed 38 is of the structured packing variety. The regions of the exchange column 10 beneath the upper packing bed 38 are shown for the purpose of illustration and include a heavier fluid collector 40 disposed beneath a support grid 41 in support of the upper structured packing 38. The column 10 is presented with cut-line 43 for illustrating the fact that the tower internals arrangement is diagrammatical only and is provided for referencing various component arrays therein.

Referring still to FIG. 1, an assembly of a pair of trays is also shown for purposes of illustration. In many instances, process columns contain only packing, only trays, or combinations of packing and trays. The present illustration is, however, a combination for purposes of discussion of the overall tower and its operation. A trayed column usually contains a plurality of trays 48 of the type shown herein. In many instances, the trays 48 are valve or sieve trays. Valve trays, comprising the subject matter of the present disclosure, are herein shown. Such trays comprise plates which are punched or slotted in construction. Within the scope of the disclosure and for the purposes of the description of various embodiments herein, the configuration referred to as a "valve" or "unit" includes anything at the intersection of and facilitating the dispersion contact between a lighter fluid 15 and a heavier fluid 13. The lighter fluid 15 and the heavier fluid 13 engage at or along the tray. Optimally, the lighter-fluid 15 and heavier-fluid 13 flows reach a level of stability. With the utilization of appropriate downcomers, to be described in more detail below, this stability may be achieved with a relatively low flow rate permitting the ascending lighter fluid 15 to mix with the descending heavier fluid 13. In some embodiments of sieve tray or fixed valve trays, no downcomers are used and the lighter fluid 15 and the heavier fluid 13 use the same openings, alternating as the respective pressures change.

In the present embodiment, cross-flow valve trays 48 and 49 and downcomers 53 and 69 are illustrated. Tray 48 is constructed with a plurality of floating valves. Tray 49 also illustrates a raised inlet section 51 beneath downcomer 53, which is substantially planar, formed with a plurality of apertures, and which may include a series of momentum deflector barriers, as will be described below. The raised inlet area is described in more detail in U.S. Pat. No. 4,956,127 (the '127 patent). Corrosion is another consideration in designing packed towers and for the selection of the material, design, and the fabrication of the tower internals.

Figure 2:
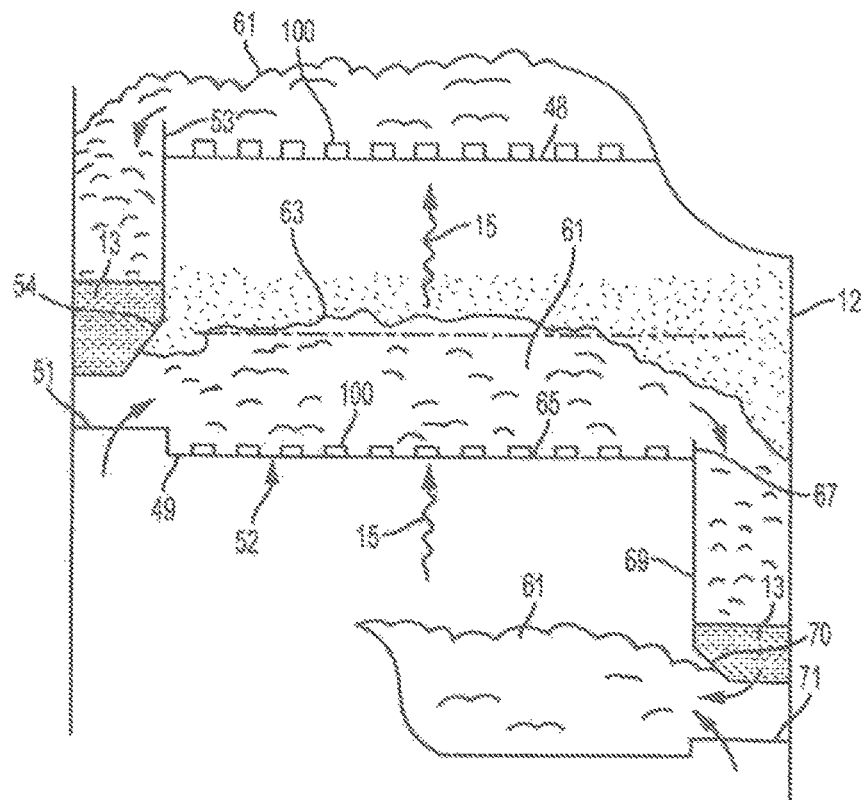
FIG. 2 is a diagrammatic, side-elevational, cross-sectional view of a downcomer-tray assembly secured within a process tower and illustrating the flow of heavier fluid and lighter fluid thereacross in accordance with an illustrative embodiment.

FIG. 2 illustrates a side-elevational, cross-sectional, diagrammatic view of the trays 48 and 49 of FIG. 1. An upper tray 48 comprises a first valved panel. The lower tray 49 is also of generally planar construction across its central active area 52, having a plurality of valves 100 mounted thereon, disposed therein, or formed therefrom as diagrammatically shown. Heavier fluid 13 travels down a downcomer 53 having a straight, sloped, tapered or mitered bottom section 54, from tray 48 disposed thereabove. The tapered section 54 of the downcomer provides a clearance angle for lighter fluid flow from the active inlet area, which clearance angle affords a horizontal flow vector to the lighter fluid vented through a flat or raised panel 51. The heavier fluid 13 engages lighter fluid 15 discharged from the active panel area 51 beneath the downcomer 53.

Still referring to FIG. 2, the froth 61 extends with a relatively uniform height, shown in phantom by line 63 across the width of the tray 49 to the opposite end 65 where a weir 67 is established for maintaining the froth height 63. The accumulated froth at this point flows over the top of the weir 67 into associated downcomer 69 that carries the froth downwardly into a lower region 70 where the heavier fluid accumulates and disperses upon active inlet region 71 thereebeneath. Again active inlet region 71 is shown herein diagrammatically for purposes of illustration only. As stated herein, the area of holes and perforations for a single cross-flow plate establish the active length of the plate and the zone in which the froth 61 is established. It should be noted that the present disclosure would also be applicable to multiple downcomer configurations, wherein the downcomers and raised, active inlet areas may be positioned in intermediate areas of the trays as also described below. By increasing the total active area of active inlet areas 51 and 71, greater capacity and efficiency is achieved. It is also the manner of flow of the heavier fluid 13 across the tray 49 which is critical to tray efficiency.

Figure 3:
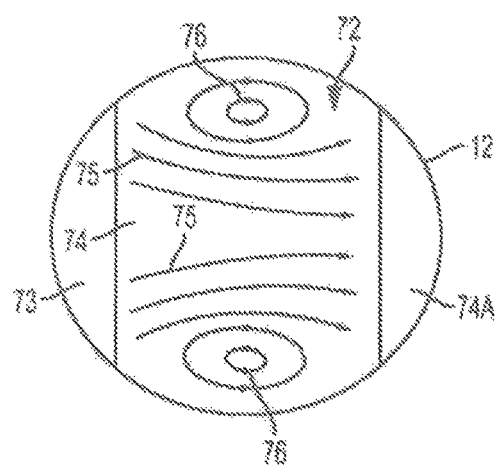
FIG. 3 is a top-plan, diagrammatic view of a tray illustrating efficiency problems with fluid flow transit in accordance with an illustrative embodiment.

FIG. 3 illustrates a flow diagram across a conventional tray. The prior art tray 72 is illustrated herein as a round unit having a first conventional downcomer for feeding heavier fluid upon an underlying panel 73 and then to the tray 74. A second downcomer 74A carries heavier fluid away from the tray. A plurality of arrows 75 illustrates the non-uniform flow of heavier fluid 13 typically observed across a conventional prior art tray which does not address the circulation issue. Circular flow is shown to be formed on both sides of the plate lateral to the direction of primary flow. The formation of these retrograde flow areas, or recirculation cells 76, decreases the efficiency of the tray. Recirculation cells 76 are the result of retrograde flow near the walls of the process column and this backflow problem becomes more pronounced as the diameter of the column increases. With the increase in retrograde flow and the resultant stagnation effect from the recirculation cells, concentration-difference driving force for mass transfer between the counter-flowing streams is reduced. The reduction in concentration-difference driving force will result in more contact or height requirement for a given separation in the column. Although back mixing is but a single aspect of plate efficiency, the reduction thereof is provided concurrently with the other advantages hereof. Reference is again made to the plate efficiency discussion set forth in above referenced '127 patent.

FIG. 4A is a top view of a tray orifice 402. In an embodiment, a valve tray 400 includes a plurality of orifices 402 formed therein. The plurality of orifices 402 includes a plurality of apertures 404 and two slots 406. In a typical embodiment, the plurality of apertures 404 includes two apertures each having a generally round shape; however, in other embodiments any number or shape of apertures could be utilized. In a typical embodiment, a valve (not shown) is secured to the tray 400 via the two slots 406. In various embodiments, the valve may be, for example, a fixed valve or a floating valve. Vapor ascends upwardly through the plurality of apertures 404 for interaction and mass transfer with a second fluid on the a surface of the tray 400. In a typical embodiment, a combined area of the plurality of apertures 404 is less than a surface area of the valve (not shown). Thus, the two apertures restrict ascension of vapor upwardly through the tray 400. In a typical embodiment, a width of the valve is approximately 1.15 to approximately 2.0 times an open area associated with the plurality of apertures 404. That is, the open area of each aperture of the plurality of apertures 404 is approximately 87% to approximately 50% of the surface area of the valve.

FIG. 4B is a top view of a tray orifice 452. In an embodiment, a tray 450 includes a plurality of orifices 452. The each orifice of the plurality of orifices 452 includes opposed ends 454 and a central portion 456. The opposed ends 454 have a greater lateral width than the central portion 456 thereby imparting a capital I shape to the plurality of orifices 454. In a typical embodiment, a valve (not shown) is secured in the opposed ends 454. In various embodiments, the valve may be, for example, a fixed valve or a floating valve. Vapor ascends upwardly through the central portion 456 for interaction and mass transfer with a second fluid on the a surface of the tray 450. In a typical embodiment, an area of the central portion 456 is less than a surface area of the valve (not shown). In a typical embodiment, a width of the valve is approximately 1.15 to approximately 2.0 times greater than an open area associated with the central portion 456. That is the open area of each orifice of the plurality of orifices 452 is approximately 87% to approximately 50% of the surface area of the valve. Thus, the central portion restricts ascension of vapor upwardly through the tray 450. FIG. 4C is a top view of a tray orifice 472. In an embodiment, a tray 470 includes a plurality of orifices 472. The plurality of orifices 472 have a generally trapezoidal shape. In a typical embodiment, a valve (not shown) is secured in a spaced relationship relative to the orifice 472. In a typical embodiment, a width of the valve is approximately 1.15 to approximately 2.0 times greater than an open area associated with the orifice 472. That is the open area of each orifice of the plurality of orifices 472 is approximately 87% to approximately 50% of the surface area of the valve. As will be discussed hereinbelow, in a typical embodiment, the valve may be at least one of a fixed valve or a floating valve.

FIG. 5 is a top view of a valve 500. The valve 500 is disposed in a spaced relationship relative to an orifice 502 in a tray deck. In a typical embodiment, the orifice 502 may be similar to those shown in FIGS. 4A-4C. The valve 500 includes a central portion 506, which central portion 506 is spaced from the orifice 502. As shown by way of example in FIG. 5, the central portion 506 exhibits a generally trapezoidal shape; however, in other embodiments, valves utilizing principles of the disclosure may have central portions of any shape. An upstream leg 512 and a downstream leg 510 support the central portion and maintain the central portion 506 in the spaced relationship with the orifice 502. A vane 508 is formed on either side of the central portion 506. The vanes 508 extend outwardly and downwardly from the central portion 506. During operation, the vanes 508 direct ascending fluid downwardly onto the tray deck thereby facilitating fluid interaction.

Still referring to FIG. 5, the central portion 506 extends beyond the edges of the orifice 502 in both a length-wise and a width-wise direction. Thus, the central portion 506 has a surface area that is larger than an area of the orifice 502. In a typical embodiment, the central portion is approximately 1.15 to approximately 2.0 times larger than an area of the orifice 502. That is an open area of the orifice 502 is approximately 87% to approximately 50% of the surface area of the central portion 506 of the valve 500. The valve cover width to orifice width ratio may range from lower ratio of about 1.15 to a higher ratio of about 4.0. The preferred ratio, depending on the specifics of the application, is in the range of 1.3-2.3. Such an arrangement restricts passage of the lighter fluid ascending through the orifice 502 and provides proper pressure drop control for design-range requirements. Such an arrangement also allows a larger escape area for ascending fluid thereby increasing capacity resulting from lower velocity escape and reduced spray heights. Chances of fouling are also reduced as a result of the larger escape area. Additional information regarding the valve cover width to orifice width ratio is provided in the following table.

TABLE 1

Ratio of Valve width/Orifice width

| | |
|---|---|
| Minimum | Min Ratio @ 46/40 = 1.15 |
| Standard | Std Ratio @ 26/20 = 1.3 |
| Preferred (~cost vs. performance) | Preferred Ratio @ 32/15 = 2.13 RATIO |
| Maximum | Max Ratio @ 40/10 = 4.0 |

FIG. 6 is an end view of the valve 500. The upstream leg 512 includes barriers 614 extending from either side of an upper aspect of the upstream leg 512. The barriers 614 have a width and a height generally equal to that of the vanes 508. Thus, the barriers 614 effectively "close off" an end portion of the vanes 508 and obstruct fluid flow therethrough. By closing off the corners between the upstream leg 512 and the vanes 508, a more uniform mixing contact from the valve 500 is accomplished.

Referring to FIGS. 4A-6 collectively, the vanes 508 direct ascending fluid in a downward direction thereby creating a vena contracta between a lower edge of the vanes 508 and a tray deck. Such a phenomenon encourages the ascending fluid to distribute across the tray deck and mix with heavier fluid moving laterally, thereby improving the contact efficiency.

Figure 7A:
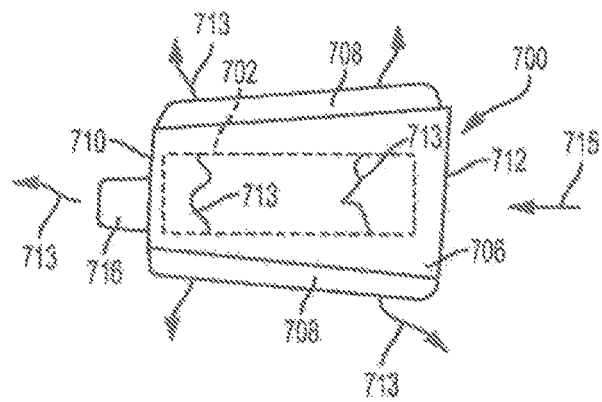
FIG. 7A is a top view of a valve having a tab according to an illustrative embodiment.
Figure 7B:
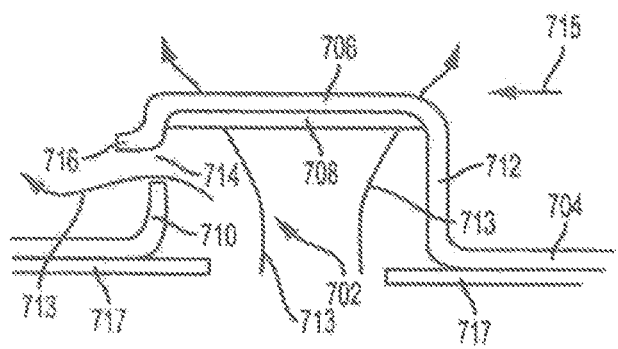
FIG. 7B is a cross-sectional view of the valve of FIG. 7A according to an illustrative embodiment.

FIG. 7A is a top view of a valve 700. FIG. 7B is a cross-sectional view of the valve 700. The valve 700 is disposed in a spaced relationship relative to an orifice 702 in a tray deck 704. In a typical embodiment, the orifice 702 may be similar to those shown in FIGS. 4A-4C. The valve 700 includes a central portion 706, which central portion 706 is spaced from the orifice 702. As shown by way of example in FIG. 5, the central portion 706 exhibits a generally trapezoidal shape; however, in other embodiments, valves utilizing principles of the disclosure may have central portions of any shape. An upstream leg 712 and a downstream leg 710 support the central portion 706 and maintain the central portion 706 in the spaced relationship with the orifice 702. In a typical embodiment, an area of the central portion 706 is approximately 1.15 to approximately 2.0 times larger than an open area of the orifice 702. That is an open area of the orifice 702 is approximately 87% to approximately 50% of the surface area of the central portion 706 of the valve 700. In various embodiments, a secondary plate is secured to an underside of the tray deck 704 beneath the orifice 702. The secondary plate reduces a size of the orifice 702 relative to the valve 700 as noted above. In various embodiments an orifice 714 is disposed in the downstream leg 710. A tab 716 is formed adjacent to the orifice 714 for directing fluid emerging from the orifice 714 in a desired direction. A vane 708 may be formed on either side of the central portion 706. The vanes 708 extend outwardly and downwardly from the central portion 706.

Still referring to FIGS. 7A-7B, the vanes 708 direct ascending fluid 713 in a downward direction thereby creating a vena contracta between a lower edge of the vanes 708 and the tray deck 704. Such a phenomenon encourages the ascending fluid 713 to distribute across the tray deck and mix with heavier fluid 715 moving laterally, thereby reducing pressure drop across the valve 700 and improving the contact efficiency.

Figure 8:
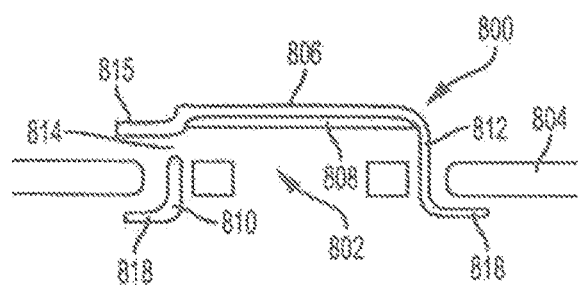
FIG. 8 is a cross-sectional view of a floating valve according to an illustrative embodiment.

FIG. 8 is a cross-sectional side view of a valve 800. The valve 800 is disposed in a spaced relationship relative to an orifice 802 in a tray deck 804. In a typical embodiment, the orifice 802 is similar to at least one of those shown in FIGS. 4A-4C. The valve 800 includes a central portion 806, which central portion 806 is spaced from the orifice. In a typical embodiment, the central portion 806 exhibits a generally trapezoidal shape; however, in other embodiments, valves utilizing principles of the disclosure may have central portions of any shape. In a typical embodiment, an area of the central portion 806 is approximately 1.15 to approximately 2.0 times larger than an open area of the orifice 802. That is an open area of the orifice 802 is approximately 87% to approximately 50% of the surface area of the central portion 806 of the valve 800. An upstream leg 812 and a downstream leg 810 support the central portion and maintain the central portion 806 in the spaced relationship with the orifice. In various embodiments an orifice 814 is disposed in the downstream leg 810. A tab 816 is formed adjacent to the orifice 814 for directing fluid emerging from the orifice 814 in a desired direction.

Still referring to FIG. 8, a securement lip 818 extends from a lower aspect of each of the upstream leg 812 and the downstream leg 810. The securement lip 818 secures the valve 800 with respect to the orifice 802 and restricts the range of the valve 800 from the tray deck 804. In a typical embodiment, the valve 800 may translate in along a vertical axis relative to the tray deck 804. Thus, a height of the valve 800 is dictated by a volume of fluid passing through the orifice 802. During operation of a tower, an upward flow of fluid through the orifice 802 lifts the valve 800 from the tray deck 804 until the securement lips 818 come into contact with an underside of the tray deck 804. In this manner, the valve 800 is able to "float" with respect to the tray deck 804. The securement lip 818 defines an upper limit of movement of the valve 800. A vane 808 is formed on either side of the central portion 806. The vanes 808 extend outwardly and downwardly from the central portion 806.

Still referring to FIG. 8, the vanes 808 direct ascending fluid in a downward direction thereby creating a vena contracta between a lower edge of the vanes 808 and the tray deck 804. Such a phenomenon encourages the ascending fluid to distribute across the tray deck and mix with heavier fluid moving laterally, thereby improving the contact efficiency.

Figure 9:
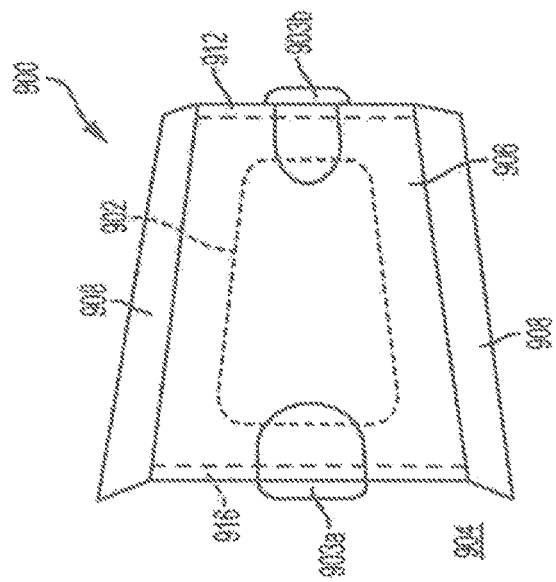
FIG. 9 is a top view of a valve positioned over an orifice according to an illustrative embodiment.

FIG. 9 is a top view of a valve 900 positioned over an orifice 902 formed in a tray deck 904. As shown in FIG. 9, the orifice 902 is generally trapezoidal in shape and includes securement slots 903a and 903b. The valve 900 includes a central portion 906 positioned above and in a spaced relationship relative to the orifice 902. In a typical embodiment, an area of the central portion 906 is approximately 1.15 to approximately 2.0 times larger than an open area of the orifice 902. That is an open area of the orifice 902 is approximately 87% to approximately 50% of the surface area of the central portion 906 of the valve 900. An upstream securement leg 910 and a downstream securement leg 912 extend from the central portion 906 and are arranged substantially perpendicular thereto. The upstream securement leg 910 extends through the securement slot 903a and the downstream securement leg 912 extends through the securement slot 903b. A portion of the upstream securement leg 910 that extends through the securement slot 903a is bent inwardly towards the downstream securement leg 912. Likewise, a portion of the downstream securement leg 912 that extends through the securement slot 903b is bent inwardly towards the upstream securement leg 910. The upstream securement leg 910 and the downstream securement leg 912 secure the valve 900 to the tray deck 904 and prevent removal of the valve 900 therefrom.

Still referring to FIG. 9, a pair of vanes 908 extend laterally and downwardly from the central portion 906. In a typical embodiment, each vane of the pair of vanes 908 has a width in the range of approximately 3 mm to approximately 12 mm. In addition, each vane of the plurality of vanes 908 is angled downwardly from the central portion 906 at an angle of approximately 30 degrees to approximately 45 degrees.

Figure 10:
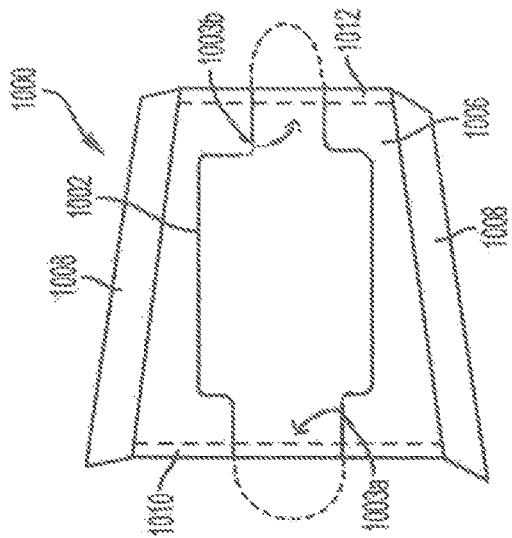
FIG. 10 is a top view of a valve positioned over an orifice according to an illustrative embodiment.

FIG. 10 is a top view of a valve 1000 positioned over an orifice 1002 formed in a tray deck 1004. As shown in FIG. 10, the orifice 1002 includes narrow portions 1003a and 1003b. The valve 1000 includes a central portion 1006 positioned above and in a spaced relationship relative to the orifice 1002. In a typical embodiment, an area of the central portion 1006 is approximately 1.15 to approximately 2.0 times larger than an open area of the orifice 1002. That is an open area of the orifice 1002 is approximately 87% to approximately 50% of the surface area of the central portion 1006 of the valve 1000. An upstream securement leg 1010 and a downstream securement leg 1012 extend from the central portion 1006 and are arranged substantially perpendicular thereto. The upstream securement leg 1010 extends through the narrow portion 1003a and the downstream securement leg 1012 extends through the narrow portion 1003b. A portion of the upstream securement leg 1010 that extends through the narrow portion 1003a is bent outwardly away from the downstream securement leg 1012. Likewise, a portion of the downstream securement leg 1012 that extends through the narrow portion 1003b is bent outwardly away from the upstream securement leg 1010. The upstream securement leg 1010 and the downstream securement leg 1012 secure the valve 1000 to the tray deck 1004 and prevent removal of the valve 1000 therefrom.

Still referring to FIG. 10, a pair of vanes 1008 extend laterally and downwardly from the central portion 1006. In a typical embodiment, each vane of the pair of vanes 1008 has a width in the range of approximately 3 mm to approximately 12 mm. In addition, each vane of the plurality of vanes 1008 is angled downwardly from the central portion 1006 at an angle of approximately 30 degrees to approximately 45 degrees.

Figure 11A:
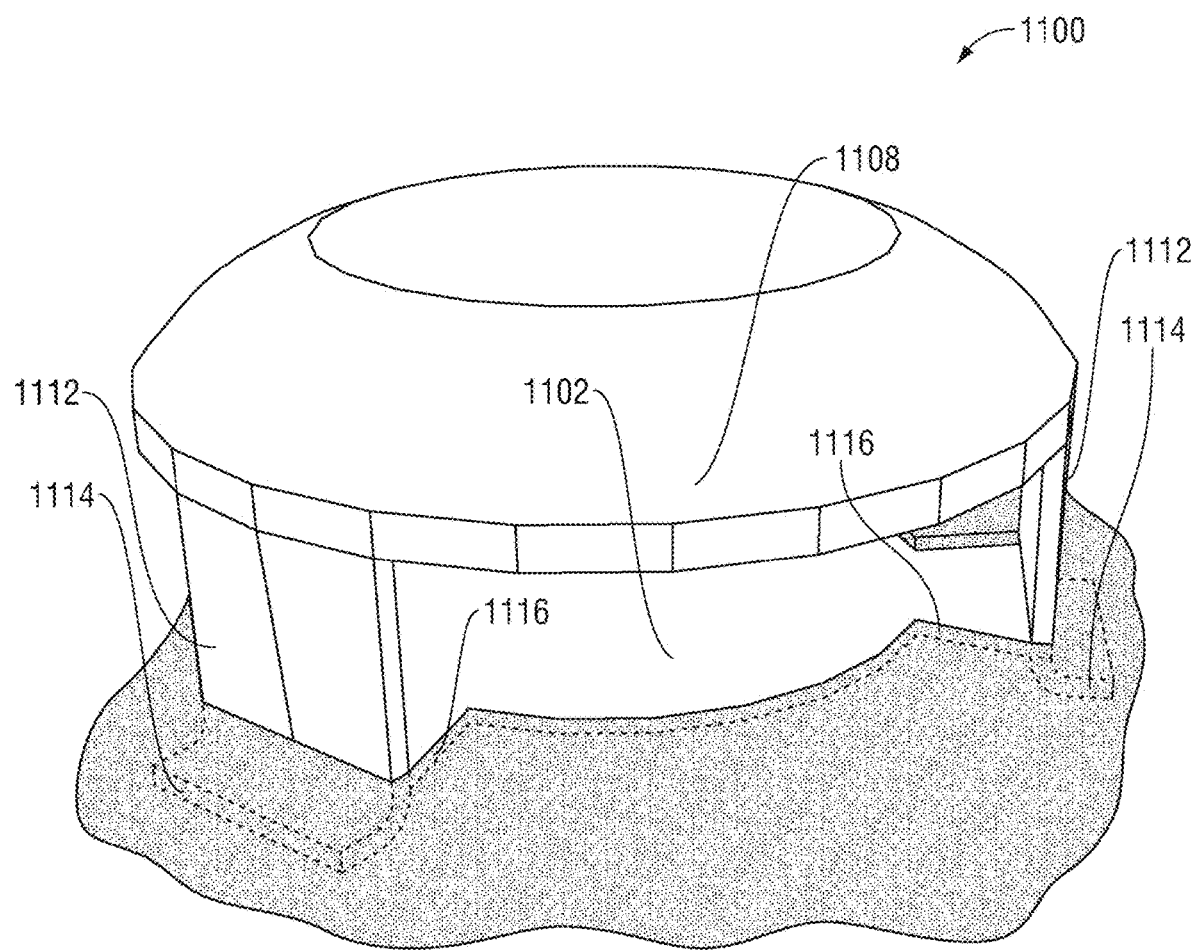
FIG. 11A is a perspective view of a domed valve according to an illustrative embodiment.

FIG. 11A is a perspective view of a valve 1100. The valve 1100 is disposed in a spaced relationship relative to an orifice 1102 in a tray deck. The valve 1100 includes a central portion 1106, which central portion 1106 is spaced from the orifice 1102. As shown by way of example in FIG. 11A, the central portion 1106 exhibits a generally round shape; however, in other embodiments, valves utilizing principles of the disclosure may have central portions of any shape. A vane 1108 is formed around a circumference of the central portion 1106. In a typical embodiment, the vane 1108 is a continuous circumferential vane formed about the valve 1100. The vane 1108 extends outwardly and downwardly from the central portion 1106. In a typical embodiment, the vane 1108 accounts for approximately 5% to approximately 50% of the diameter of the valve 1100. At least one leg 1112 extends downwardly from an edge of the vane 1108. The at least one leg 1112 supports the central portion 1106, and maintains the central portion 1106 in the spaced relationship with the orifice 1102. The at least one leg 1112 includes a tab 1114. The tab 1114 engages a slot 1116 formed proximate to the orifice 1102. In a typical embodiment, the slot 1116 may be formed adjacent to the orifice 1102 or formed within the orifice 1102 as shown by way of example in FIG. 11A. In a typical embodiment, the valve 1100 is either a fixed valve or a floating valve. In a typical embodiment, the at least one leg 1112 is a continuous extension of the vane 1108.

In traditional round valves, the retainer lags were formed downwards substantially within the cap edge causing gaps at the perimeter. Thus, the light fluid was channeled upwards at the openings rather than being directed downwards to sweep across the tray deck. This phenomenon reduces the effective vapor-liquid contact time and decreases effective mass transfer. In contrast, the valve 1100 includes an improved turning vane 1108 that directs all vapor downwards. By directing all vapor downwards towards the tray deck, contact mixing of vapor within the cross-flow liquid stream is improved. In a typical embodiment, the vane 1108 is angled relative to a top portion of the valve 1100 at an angle of approximately 11° to approximately 79° from horizontal. In a typical embodiment, an outer diameter of the valve 1100 ranges from approximately 152 mm to approximately 12 mm. During operation, the vane 1108 directs ascending fluid downwardly onto the tray deck thereby facilitating fluid interaction. In trapezoidal valves, there are advantages with respect to anti-fouling systems. For example, a directional vapor component creates a liquid-flow push across the tray at a minimum residence time. In contrast, the circular valve shape creates a natural balancing of vapor-liquid flow in omnidirectional paths. This results in an effective uniform mixing efficiency. Thus, each type of contacting valve has unique, positive attributes to be considered by a designer. Valves having directionally downward deflecting vanes are generally more efficient contacting devices that sieves or valves that lack a vena contracta component.

Still referring to FIG. 11A, the valve 1100 extends beyond the edges of the orifice 1102 in both a length-wise and a width-wise direction. Normally, the central portion 1106 has a surface area that is larger than an area of the orifice 1102. In a typical embodiment, the overall valve area is approximately 1.5 to approximately 4.0 times larger than an area of the orifice 1102. Normal open area of the orifice 1102 is approximately 67% to approximately 37% of the surface area of the valve 1100. The valve cover width to orifice width ratio may range from lower ratio of about 1.25 to a higher ratio of about 2.25. The preferred cap to orifice ratio, depending on the specifics of the application, is in the range of 1.6-2.6. Such an arrangement restricts passage of the lighter fluid ascending through the orifice 1102 and provides proper pressure drop control for design-range requirements. Such an arrangement also allows a larger escape area for ascending fluid thereby increasing capacity resulting from lower velocity escape and reduced spray heights. Chances of fouling are also reduced as a result of the larger escape area.

Figure 11B:
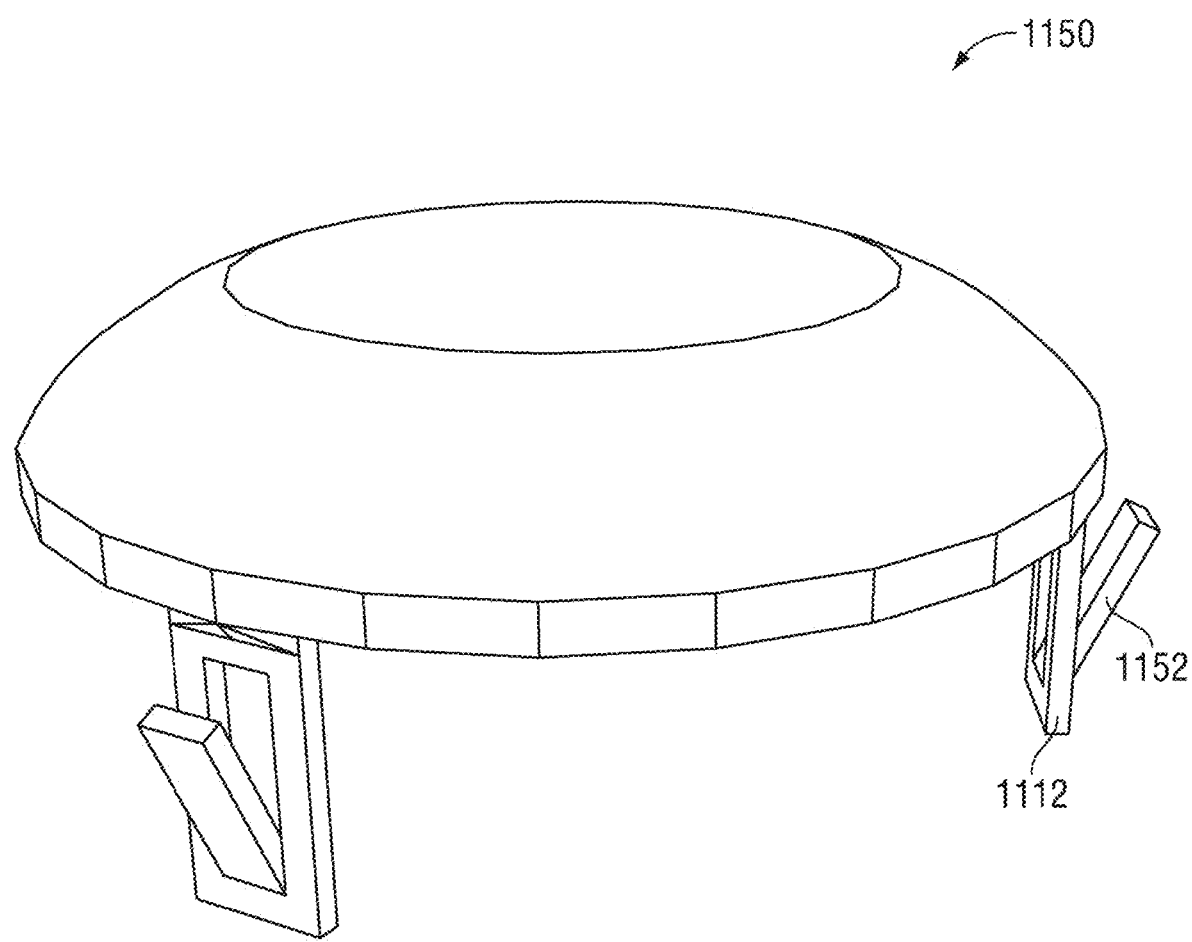
FIG. 11B is a perspective view of a domed valve having retainer clips according to an illustrative embodiment.

FIG. 11B is a perspective view of a valve 1150. The valve 1150 includes a retainer clip 1152 disposed on each leg 1112 of the plurality of legs. In a typical embodiment, the retainer clip 1152 simplifies installation of the valve 1150 to the tray deck. In a typical embodiment, during installation of the valve 1150, each leg 1112 of the plurality of legs is inserted into a slot formed in the tray deck adjacent to the orifice. As the leg 1112 passes through the slot, the retainer clip 1152 compresses into the leg 1112. When the retainer clip 1152 passes through the slot to an underside of the tray deck, the retainer clip 1152 springs outwardly from the leg 1112 thereby securing the leg 1112 to the tray deck.

Figure 11C:
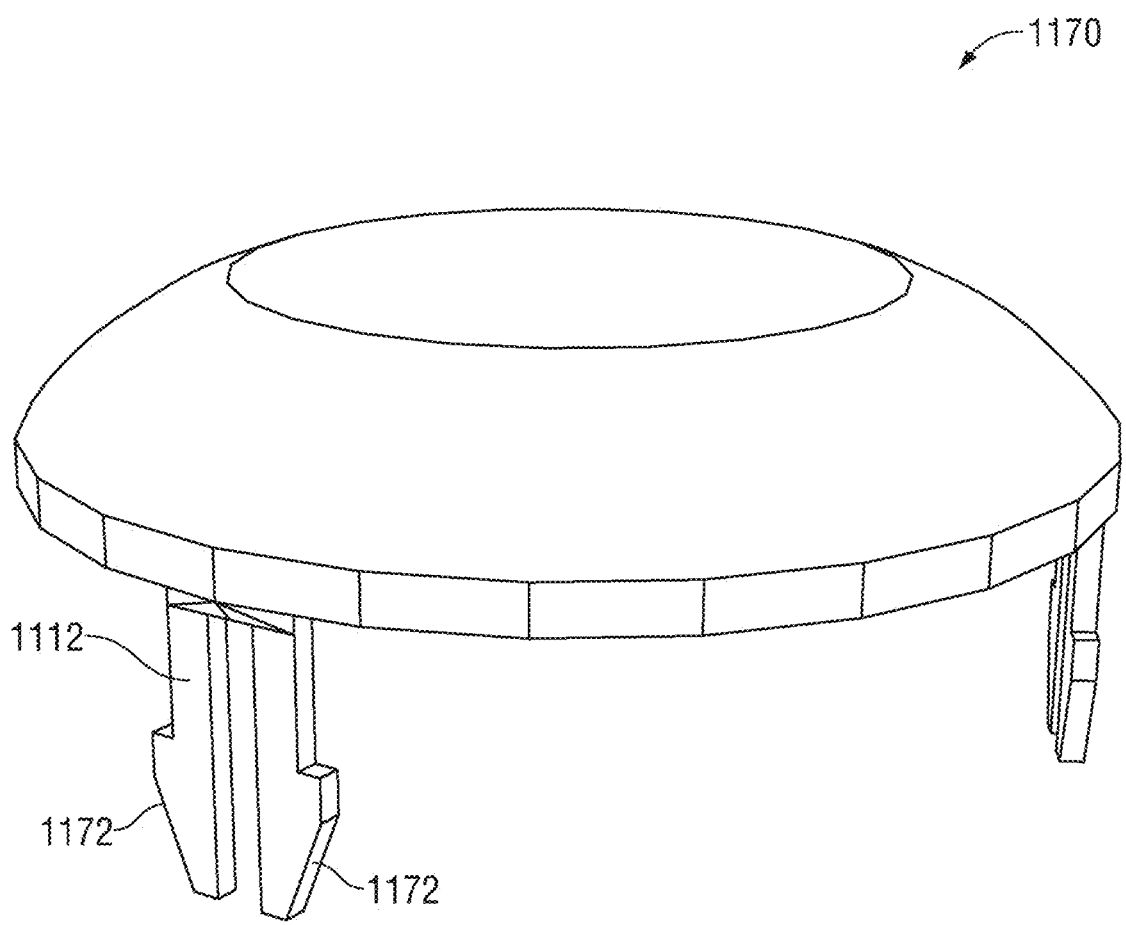
FIG. 11C is a perspective view of a domed valve having retainer tabs according to an illustrative embodiment.

FIG. 11C is a perspective view of a valve 1170. The valve 1170 includes a retainer tab 1172 disposed on each leg 1112 of the plurality of legs. In a typical embodiment, the retainer tab 1172 simplifies installation of the valve 1170 to the tray deck. In a typical embodiment, during installation of the valve 1170, each leg 1112 of the plurality of legs is inserted into a slot formed in the tray deck. As the leg 1112 passes through the slot, the retainer tap 1172 snaps into the slot thereby securing the leg 1112 to the tray deck.

Figure 12:
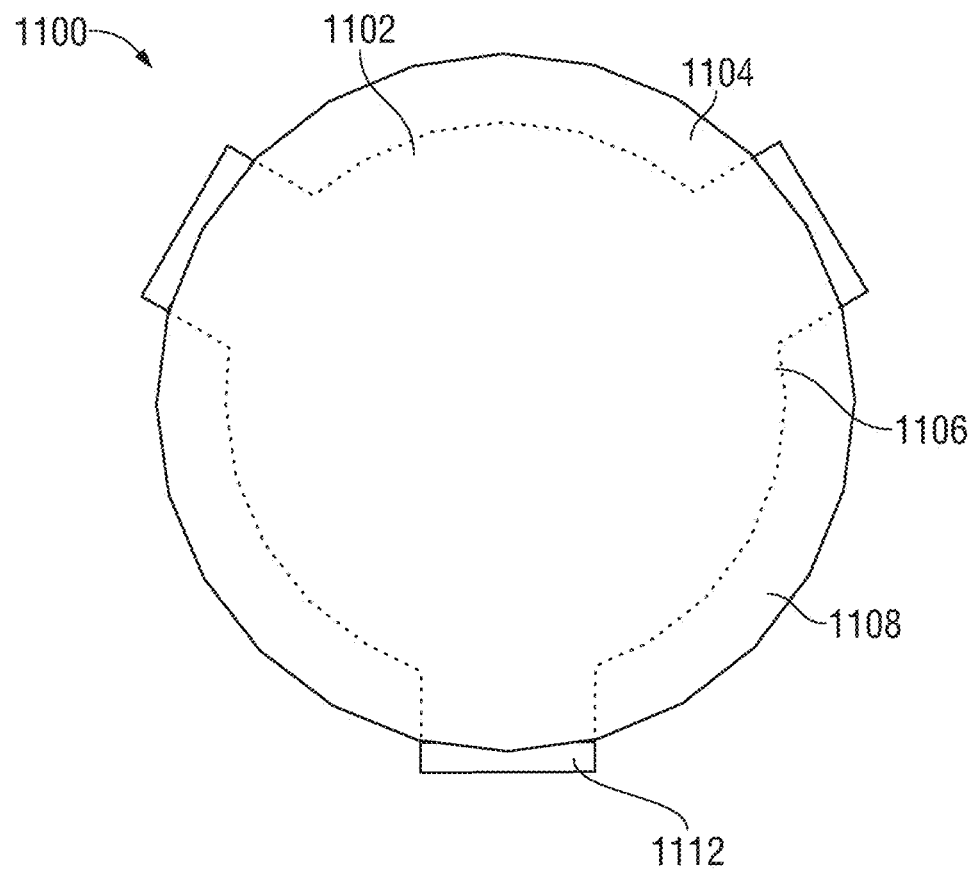
FIG. 12 is a top view of the domed valve of FIG. 11 showing a relative size of a valve orifice according to an illustrative embodiment.

FIG. 12 is a top view of the domed valve 1100 showing a relative size of a valve orifice. The valve 1100 is disposed in a spaced relationship relative to an orifice 1102 in a tray deck 1104. The valve 1100 includes a central portion 1106, which central portion 1106 is spaced from the orifice 1102. As shown by way of example in FIG. 11A, the central portion 1106 exhibits a generally round shape; however, in other embodiments, valves utilizing principles of the disclosure may have central portions of any shape. The at least one leg 1112 supports the central portion 1106 and maintains the central portion 1106 in the spaced relationship with the orifice 1102. In a typical embodiment, an area of the central portion 1106 ranges from approximately 1.05 to approximately 2.5 times larger than an open area of the orifice 1102. That is an open area of the orifice 1102 is approximately 67% to approximately 37% of the surface area of the valve 1100. In various embodiments, a secondary plate is secured to an underside of the tray deck 1104 beneath the orifice 1102. The secondary plate reduces a size of the orifice 1102 relative to the valve 1100 as noted above. A vane 1108 is formed on a circumference of the central portion 1106. The vane 1108 extends outwardly and downwardly from the central portion 1106.

Still referring to FIG. 12, the vane 1108 directs ascending fluid in a downward direction thereby creating a vena contracta between a lower edge of the vanes 1108 and the tray deck 1104. Such a phenomenon encourages the ascending fluid to distribute across the tray deck and mix with heavier fluid moving laterally, thereby reducing pressure drop across the valve 1100 and improving the contact efficiency.

Figure 13A:
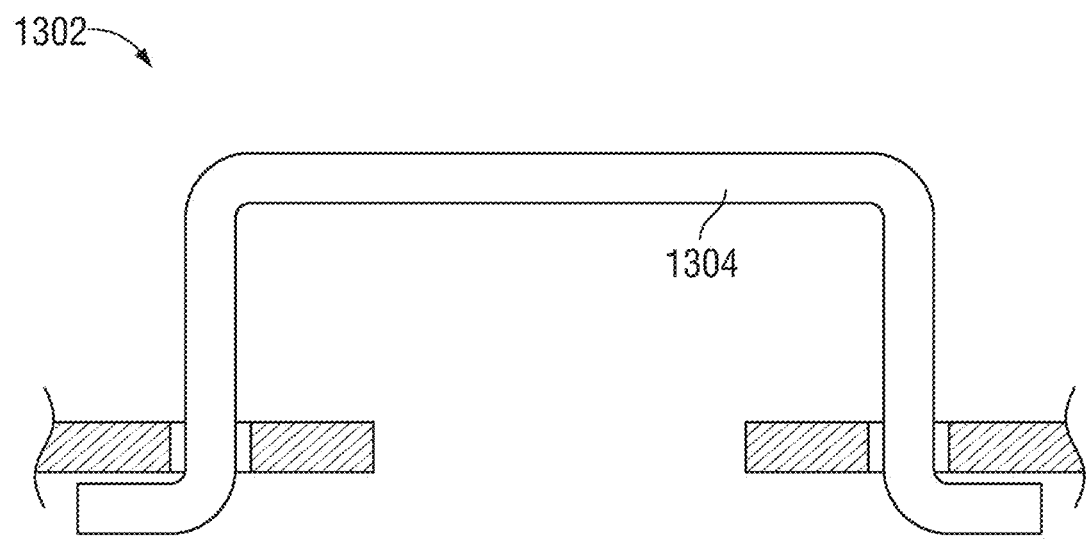
FIG. 13A is a cross sectional view of a valve having a flat top according to an illustrative embodiment.
Figure 13B:
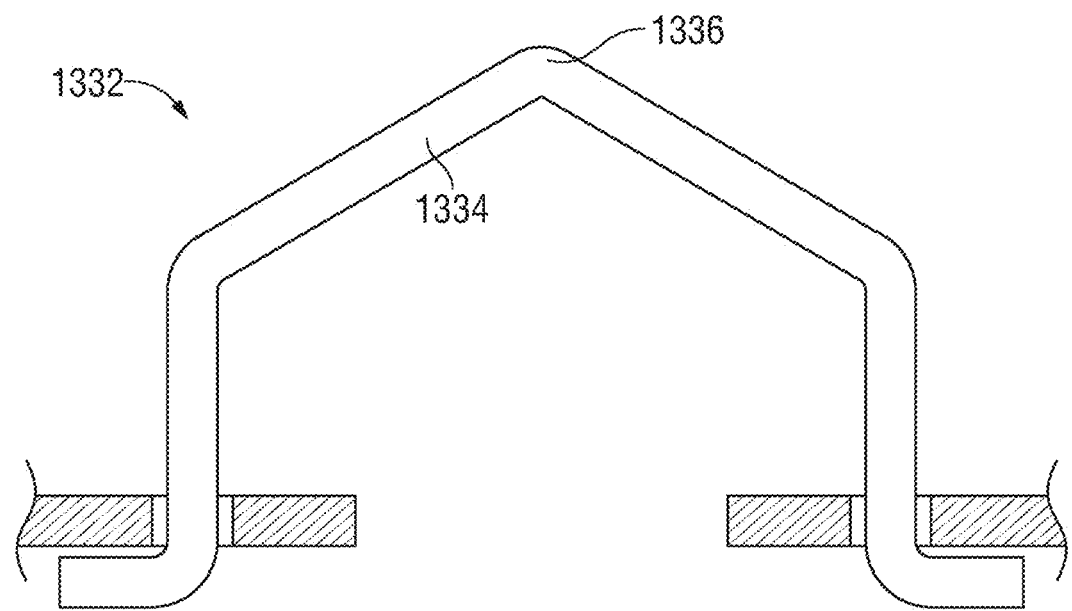
FIG. 13B is a cross sectional view of a valve having a cone top according to an illustrative embodiment.
Figure 13C:
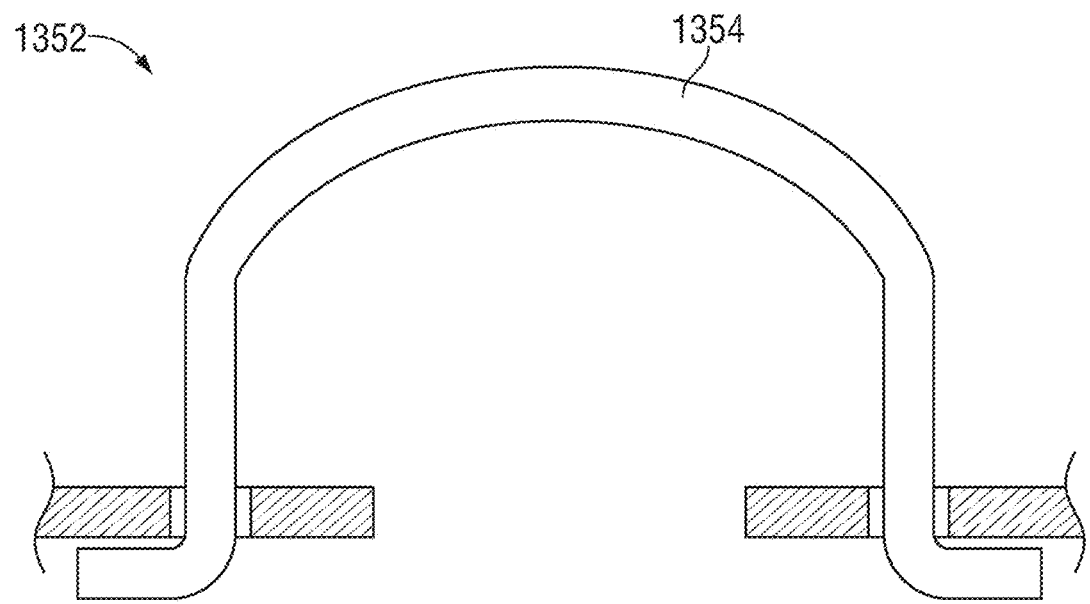
FIG. 13C is a cross sectional view of a valve having a domed top according to an illustrative embodiment.
Figure 13D:
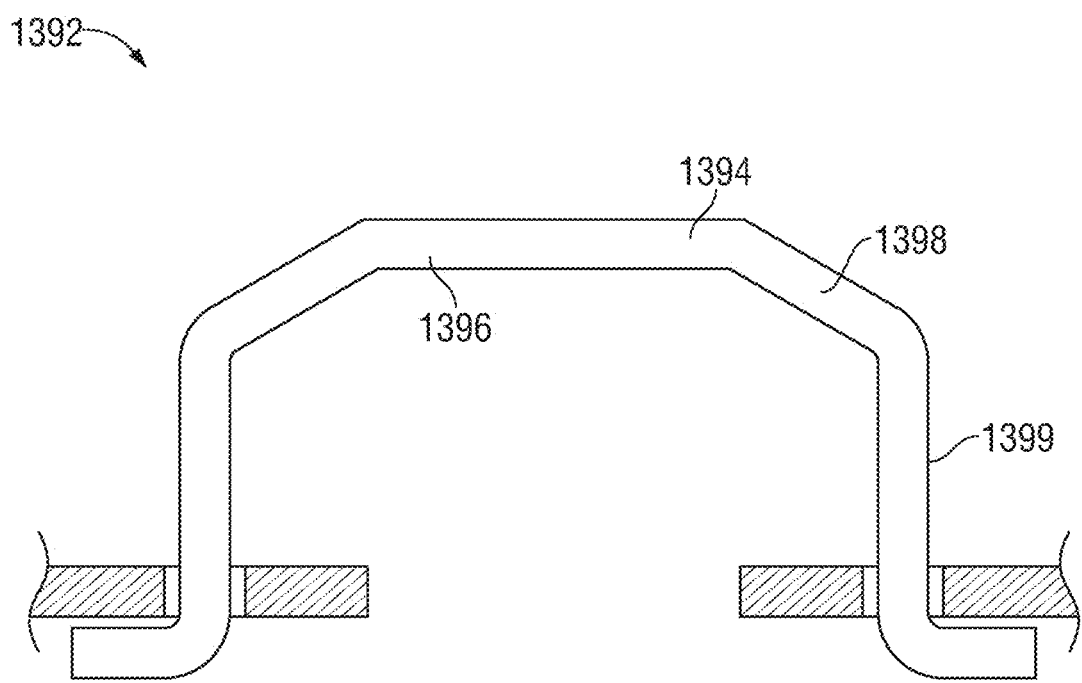
FIG. 13D is a cross sectional view of a valve having a shoulder top according to an illustrative embodiment.

FIG. 13A is a cross sectional view of a valve 1302 having a flat top 1304. The flat top of the valve 1302 affects flow of the ascending fluid 1113 therethrough and the flow of the heavier fluid 1115 therearound. FIG. 13B is a cross sectional view of a valve 1332 having a cone top 1334. The cone top 1334 comes to an apex 1336 at an approximate center of the central portion. The cone-shaped top of the valve 1302 affects flow of the ascending fluid 1113 therethrough and the flow of the heavier fluid 1115 therearound. FIG. 13C is a cross sectional view of a valve 1352 having a domed top 1354. The domed top of the valve 1302 affects flow of the ascending fluid 1113 therethrough and the flow of the heavier fluid 1115 therearound. FIG. 13D is a cross sectional view of a valve 1392 having a shoulder top 1394. The shoulder top 1394 includes a flat central area 1396 that is generally parallel to the tray deck 1304. An angulated region 1398 extends from the central area 1396 and joins the central area 1396 to the valve legs 1399. The shoulder top 1394 of the valve 1302 affects flow of the ascending fluid 1113 therethrough and the flow of the heavier fluid 1115 therearound. In a typical embodiment, fluid-flow specifications along with mechanical details and manufacturing requirements influence variations of the shape of the valve top. In a typical embodiment, the valve 1302 may be of any shape as dictated by design requirements such as, for example, round, rectangular, square, elliptical, square, or trapezoidal.

Figure 14A:
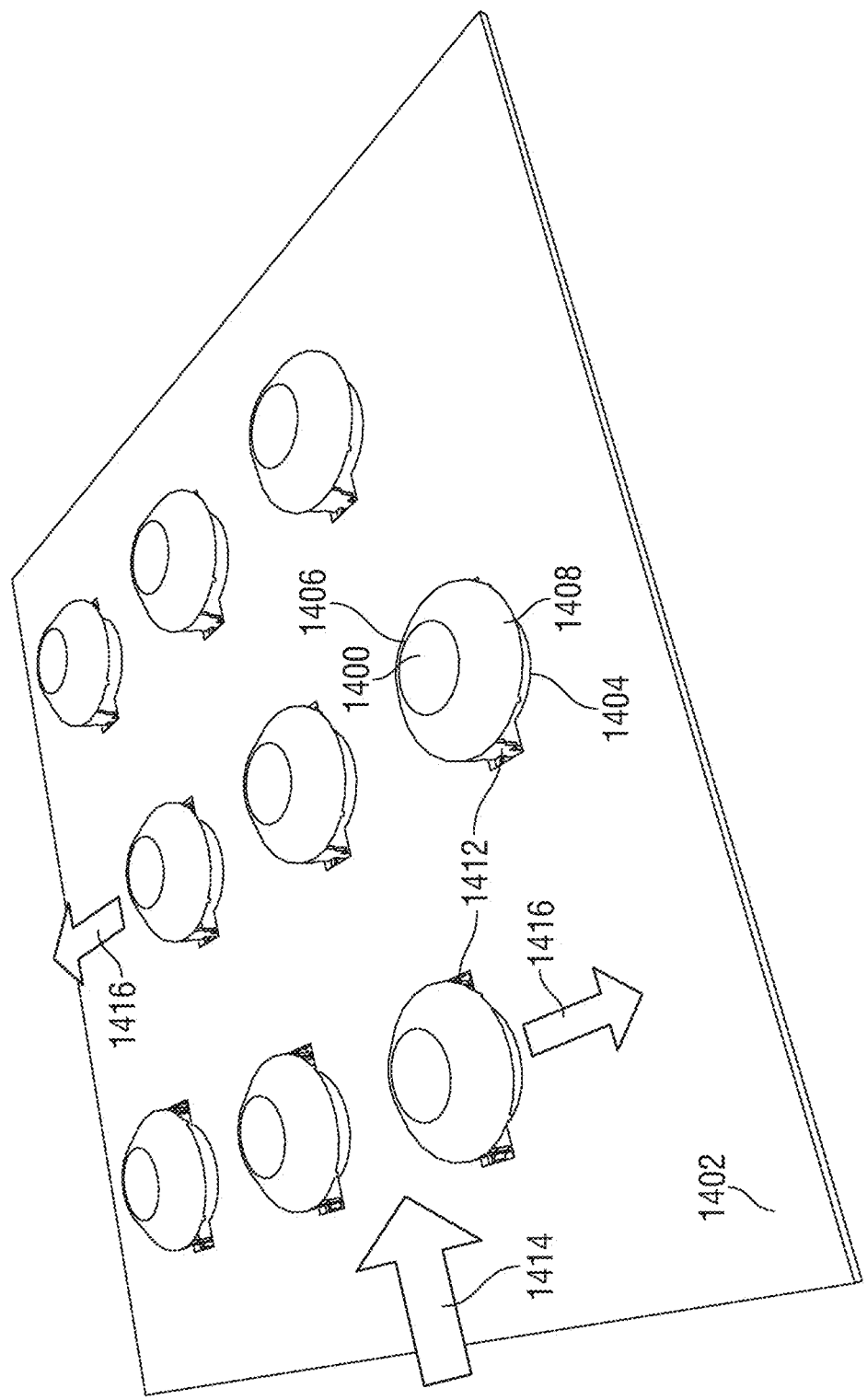
FIG. 14A is a top perspective view of a tray having a plurality of snap-in domed valves disposed therein according to an illustrative embodiment.

FIG. 14A is a top perspective view of a tray 1402 having a plurality of snap-in dome valves 1400 disposed therein. The tray 1402 includes a plurality of apertures 1404 formed therein to facilitate upward movement of fluids. Each valve 1400 is disposed proximate a corresponding aperture 1404. The valve 1400 includes a central portion 1406, which central portion 1406 is spaced from the aperture 1404. The central portion 1406 exhibits a generally round shape; however, in other embodiments, valves utilizing principles of the disclosure may have central portions of any shape such as, for example, rectangular or any other shape. At least one leg 1412 supports the central portion 1406 and maintains the central portion 1406 in the spaced relationship with the aperture 1404. In the embodiment illustrated in FIGS. 14A-B, the valve 1400 includes two legs 1412; however, in other embodiment, valves utilizing principles of the disclosure could utilize any number of legs. A vane 1408 is formed on a circumference of the central portion 1406. The vane 1408 extends outwardly and downwardly from the central portion 1406. In a typical embodiment, the vane 1408 directs ascending fluid in a downward direction thereby creating a vena contracta between a lower edge of the vane 1408 and the tray deck 1402. Such a phenomenon encourages the ascending fluid to distribute across the tray deck and mix with heavier fluid moving laterally, thereby reducing pressure drop across the valve 1400 and improving the contact efficiency.

Still referring to FIG. 14A, heavier fluid (illustrated by arrow 1414) flows across the tray 1402 in a direction generally aligned with the at least one leg 1412. The at least one leg 1412 disrupts flow of the heavier fluid 1414 around the aperture 1404 and the valve 1400. The at least one leg 1412 also causes ascending lighter fluid (illustrated by arrow 1416) to escape the valve 1400 in a direction generally perpendicular to the flow of the heavier fluid 1414. In this manner, intimate mixing and mass transfer between the heavier fluid 1414 and the lighter fluid 1416 is promoted.

Figure 14B:
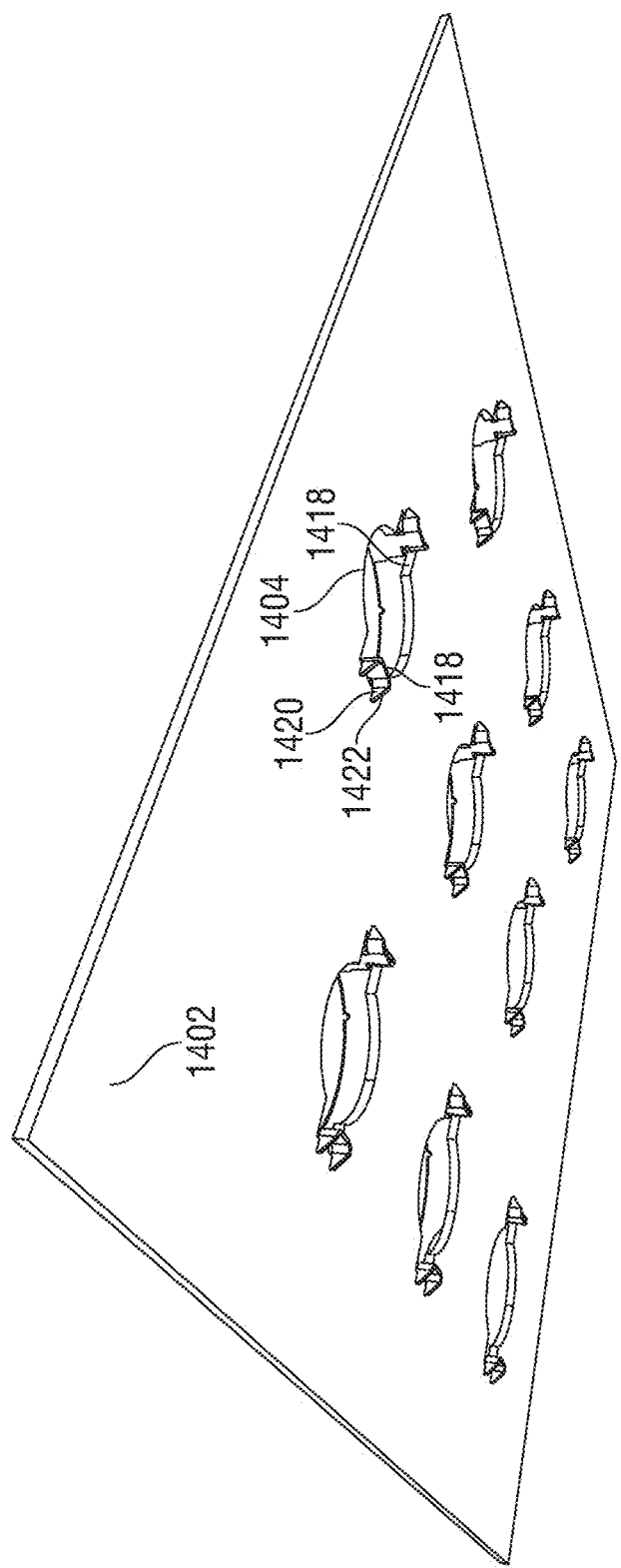
FIG. 14B is a bottom perspective view of the tray of FIG. 14A according to an illustrative embodiment.

FIG. 14B is a bottom perspective view of the tray 1402 of FIG. 14A. The apertures 1404 formed in in the tray 1402 include at least one notch 1418 formed therein. In the embodiment illustrated in FIG. 14B, the aperture includes two notches 1418; however, in a typical embodiment, the aperture 1404 includes a number of notches 1418 that corresponds to the number of legs 1412 present on the valve 1400. The leg 1412 is sized so as to be received into the notch 1418. At least one locking tab 1420 extends from the leg 1412 in a perpendicular direction. The at least one locking tab 1420 engages a bottom surface of the tray 1402 and prevents removal of the valve 1400 in an upward direction while allowing the valve 1400 to float vertically relative to the tray 1402.

Still referring to FIG. 14B, during installation, the valve 1400 is oriented with the aperture 1404 such that the legs 1412 align with the corresponding notches 1418. A beveled surface 1422 is formed on a lower aspect of the at least one locking tab 1420. The beveled surface 1422 contacts an upper surface of the tray 1402 and prevents the leg 1412 from being passively inserted into the notch 1418. A downward force is applied to the valve 1400 so as to press the valve 1400 into the aperture 1404. The beveled surface 1422 of the at least one leg 1412 slides against the upper surface of the tray 1402 and causes the leg 1412 to deflect inwardly. When an upper surface of the locking tab 1420 passes below the lower surface of the tray 1402, the spring properties of the leg 1412 cause the leg 1412 to return to its original position. The locking tab 1420 thereby secures the leg 1412 in the notch 1418 and prevents removal of the valve 1400 from the tray 1402 while allowing the valve 1400 to float vertically relative to the tray 1402.

Figure 15A:
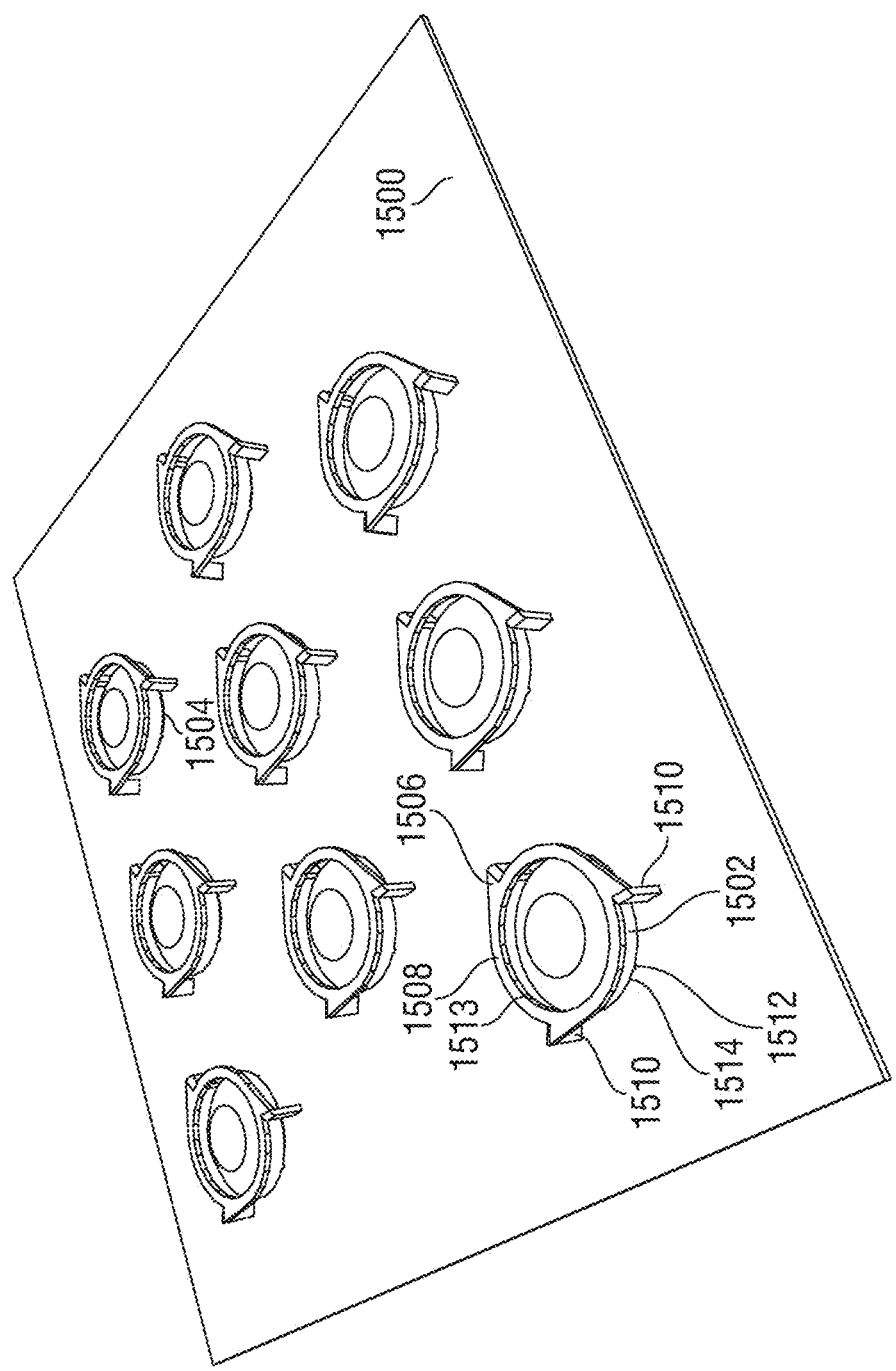
FIG. 15A is a top perspective view of a tray having a plurality of valves located thereon and secured in place with a three-legged cage according to an illustrative embodiment.
Figure 15B:
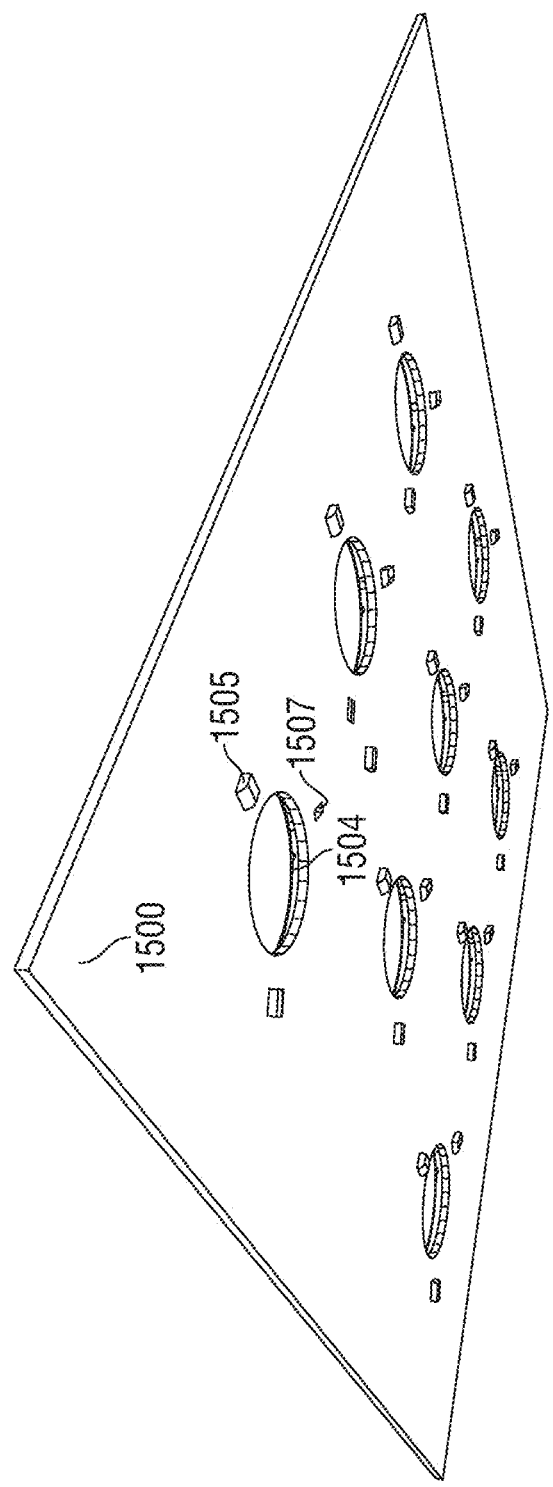
FIG. 15B is a bottom perspective view of a tray having a plurality of valves located thereon and secured in place with a three-legged cage according to an illustrative embodiment.

FIG. 15A is a top perspective view of a tray 1500 having a plurality of valve covers 1502 located thereon and secured in place with a three-legged cage 1506. FIG. 15B is a bottom perspective view of the tray 1500. The tray 1500 includes a plurality of apertures 1504 formed therein. A plurality of retaining cages 1506 are affixed to the tray 1500 such that one retaining cage 1506 is placed proximate to a corresponding aperture 1504. The retaining cage 1506 includes an upper portion 1508 and a plurality of legs 1510. As shown in FIG. 15B, a tab 1505 extends downwardly from each leg of the plurality of legs 1510. The tab 1505 is received into corresponding slots 1507 formed in the tray 1500 adjacent the aperture 1504. Upon receipt of the tab 1505 into the corresponding slots 1507 the tab 1505 may be bent outwardly to secure the cage 1506 to the tray 1500. In the embodiment illustrated in FIGS. 15A-15B, the cage 1506 includes three legs 1510; however in other embodiments, the cage 1506 can include any number of legs 1510. The upper portion 1508 of the cage 1506 is generally circular and has an opening 1513 disposed in an approximate center. The valve cover 1502 is disposed within the cage 1506 above the aperture 1504. The valve cover 1502 is free to move on an approximate vertical axis towards and away from the aperture 1504; however, the cage 1506 limits the distance of vertical travel of the valve cover 1502. In a typical embodiment, the legs 1510 prevent lateral movement of the valve cover 1502. The valve cover 1502 is dome-shaped and has a height of at least approximately $3/16$ inch from an edge of the dome to a central apex. At least one anti-stick tab 1512 may be formed on an outer edge 1514 of the valve cover 1502. In a typical embodiment, the anti-stick tab 1512 prevents the valve cover 1502 from adhering to the surface of the tray 1500. In a typical embodiment, a sharp edge formed on the orifice 1504 and the valve cover 1502 enhances fluid mixing and tray efficiency.

Figure 16A:
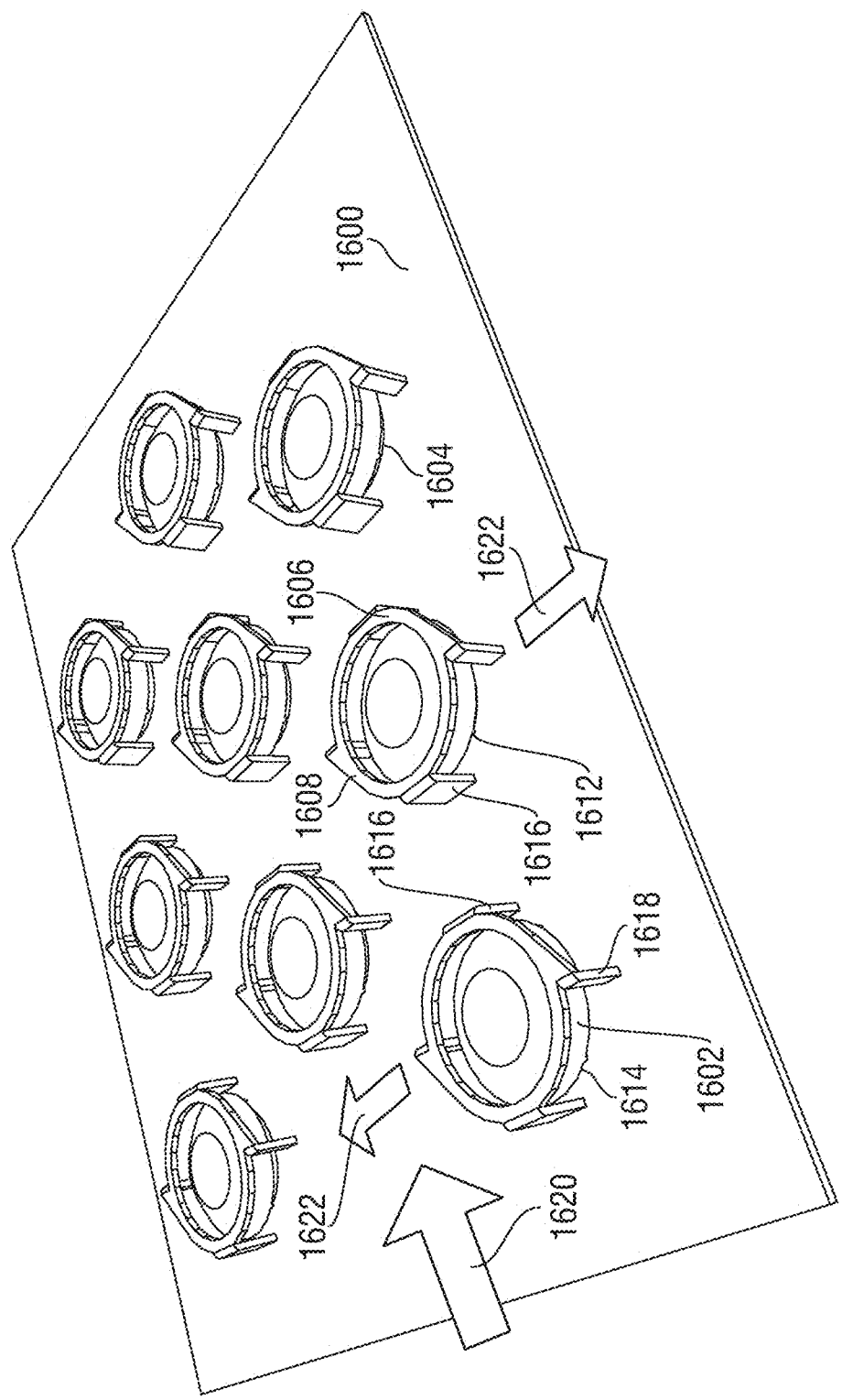
FIG. 16A is a top perspective view of a tray having a plurality of valves located thereon and secured in place with a four-legged cage according to an illustrative embodiment.
Figure 16B:
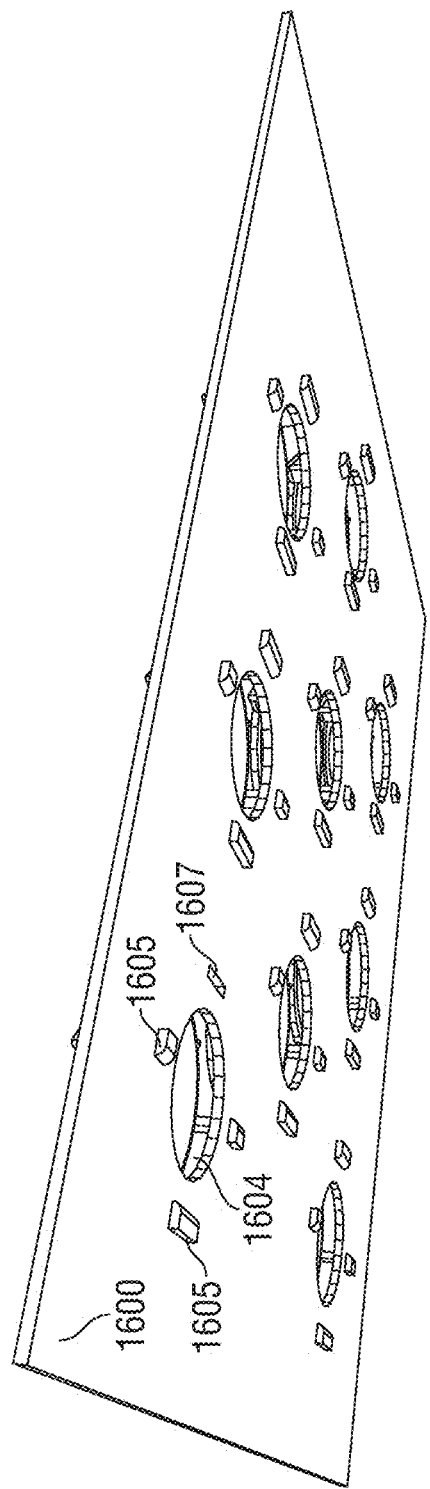
FIG. 16B is a bottom perspective view of a tray having a plurality of valves located thereon and secured in place with a four-legged cage according to an illustrative embodiment.

FIG. 16A is a top perspective view of a tray 1600 having a plurality of valve covers 1602 located thereon and secured in place with a four-legged cage 1606. FIG. 16B is a bottom perspective view of the tray 1600. The tray 1600 includes a plurality of apertures 1604 formed therein. A plurality of retaining cages 1606 are affixed to the tray 1600 such that one retaining cage 1606 is placed proximate to a corresponding aperture 1604. The retaining cage 1606 includes an upper portion 1608, wide legs 1616, and narrow legs 1618. As shown in FIG. 16B, a tab 1605 extends downwardly from each leg of the wide legs 1616 and the narrow legs 1618. The tab 1605 is received into corresponding slots 1607 formed in the tray 1600 adjacent the aperture 1604. Upon receipt of the tab 1605 into the corresponding slots 1607 the tab 1605 may be bent outwardly to secure the cage 1606 to the tray 1600. In the embodiment illustrated in FIGS. 16A-16B, the cage 1606 includes four legs; however in other embodiments, the cage 1606 can include any number of legs. In the embodiment shown in FIGS. 16A-16B, the cage 1606 includes two wide legs 1616 and two narrow legs 1618. The wide legs 1616 are arranged opposite each other and are placed generally parallel to a direction of flow of a heavier fluid across the tray 1600 (illustrated by arrow 1620). The narrow legs 1618 are arranged opposite each other and are placed generally perpendicular to the flow of the heavier fluid 1620). In a typical embodiment, the wide legs 1616 block egress of a lighter fluid from the area under the valve cover 1602 (illustrated by arrow 1622). The lighter fluid 1622 thus exits the valve cover 1602 in a direction generally perpendicular to the flow of the heavier fluid 1620. In this manner, intimate mixing and mass transfer between the heavier fluid 1620 and the lighter fluid 1622 is promoted.

Still referring to FIGS. 16A-16B, the upper portion 1608 of the cage 1606 is generally circular and has an opening 1613 disposed in an approximate center. The valve cover 1602 is disposed within the cage 1606 above the aperture 1604. The valve cover 1602 is free to move on an approximate vertical axis towards and away from the aperture 1604; however, the cage 1606 limits the distance of vertical travel of the valve cover 1602. In a typical embodiment, the narrow legs 1618 prevent lateral movement of the valve cover 1602. The valve cover 1602 is dome-shaped and has a height of at least approximately 3/16 inch from an edge of the dome to a central apex. At least one anti-stick tab 1612 may be formed on an outer edge 1614 of the valve cover 1602. In a typical embodiment, the anti-stick tab 1612 prevents the valve cover 1602 from adhering to the surface of the tray 1600.

Figure 17:
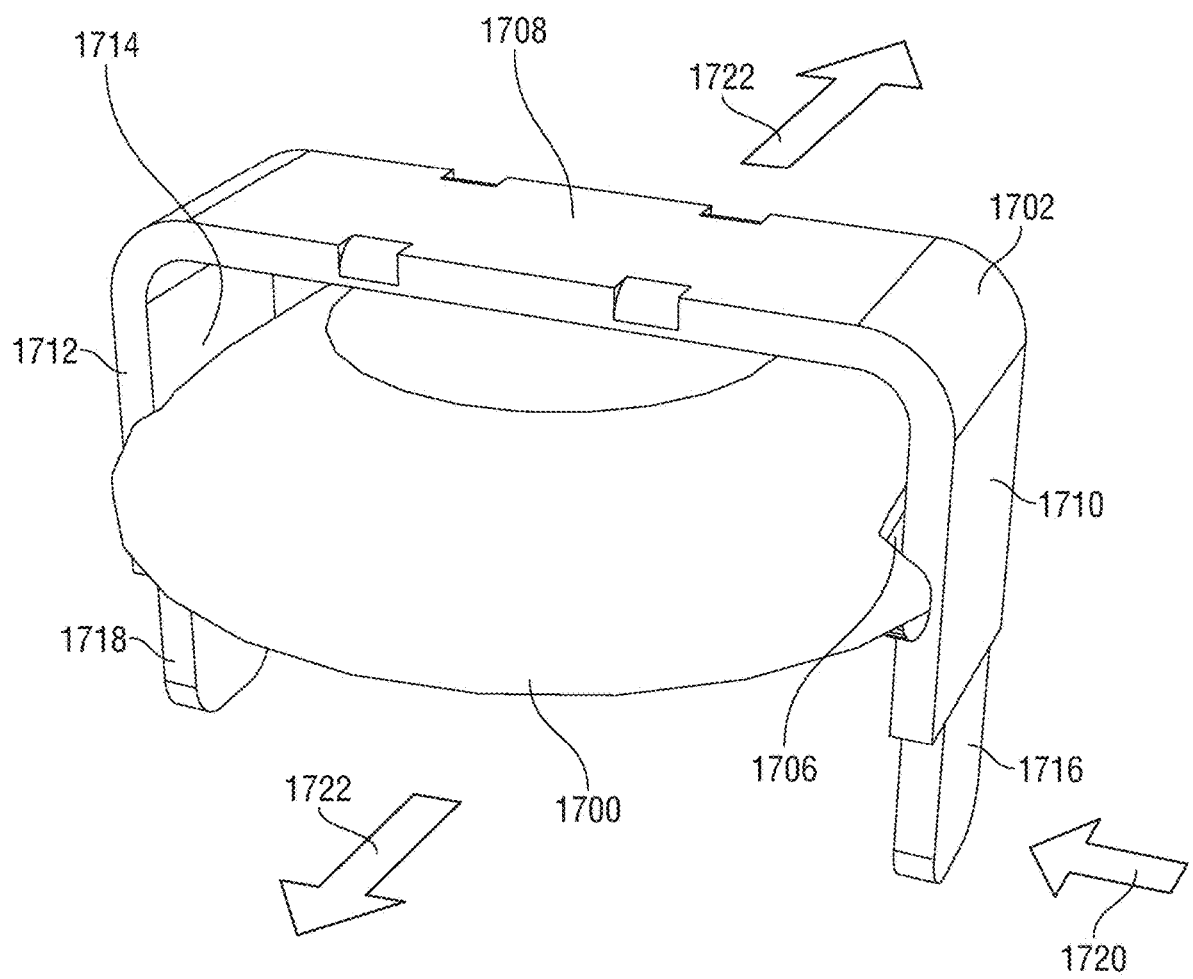
FIG. 17 is a perspective view of a captive valve having a securement strap according to an illustrative embodiment.

FIG. 17 is a perspective view of a captive valve 1700 having a securement strap 1702 coupled thereto. The valve 1700 is domed shaped and is free to move on an approximate vertical axis towards and away from an associated aperture formed in a tray. In a typical embodiment, the valve 1700 has a depth of approximately 6 millimeters to approximately 12 millimeters; however, in other embodiments, valves of differing depths could be utilized. The strap 1702 extends over a top of the valve 1700 and restricts vertical travel of the valve 1700. The strap 1702 includes a top section 1708, a first leg 1710, and a second leg 1712. A first notch 1706 and a second notch 1714 are formed in an edge of the valve 1700. The first notch 1706 and the second notch 1714 receive the first leg 1710 and the second leg 1712, respectively. Interaction of the first leg 1710 and the second leg 1712 with the first notch 1706 and the second notch 1714, respectively, prevents rotation or lateral movement of the valve 1700. In a typical embodiment, a first tab 1716 extends downwardly from a bottom of the first leg 1710 and a second tab 1718 extends downwardly from a bottom of the second leg 1712. The first tab 1716 is received into a first slot formed in the tray 1704 adjacent the aperture and the second tab 1718 is received into a second slot formed in the tray 1704 opposite the first slot. Upon receipt of the first tab 1716 and the second tab 1718 into the first and second slots, respectively, the first tab 1716 and the second tab 1718 may be bent outwardly to secure the strap 1702 to the tray 1704.

Still referring to FIG. 17, the first leg 1710 and the second leg 1712 are arranged are placed generally parallel to a direction of flow of a heavier fluid across the tray 1704 (illustrated by arrow 1720). In a typical embodiment, the first leg 1710 and the second leg 1712 block egress of a lighter fluid from the area under the valve 1700 (illustrated by arrow 1722). The lighter fluid 1722 thus exits the valve 1700 in a direction generally perpendicular to the flow of the heavier fluid 1720. In this manner, intimate mixing and mass transfer between the heavier fluid 1720 and the lighter fluid 1722 is promoted.

Figure 18A:
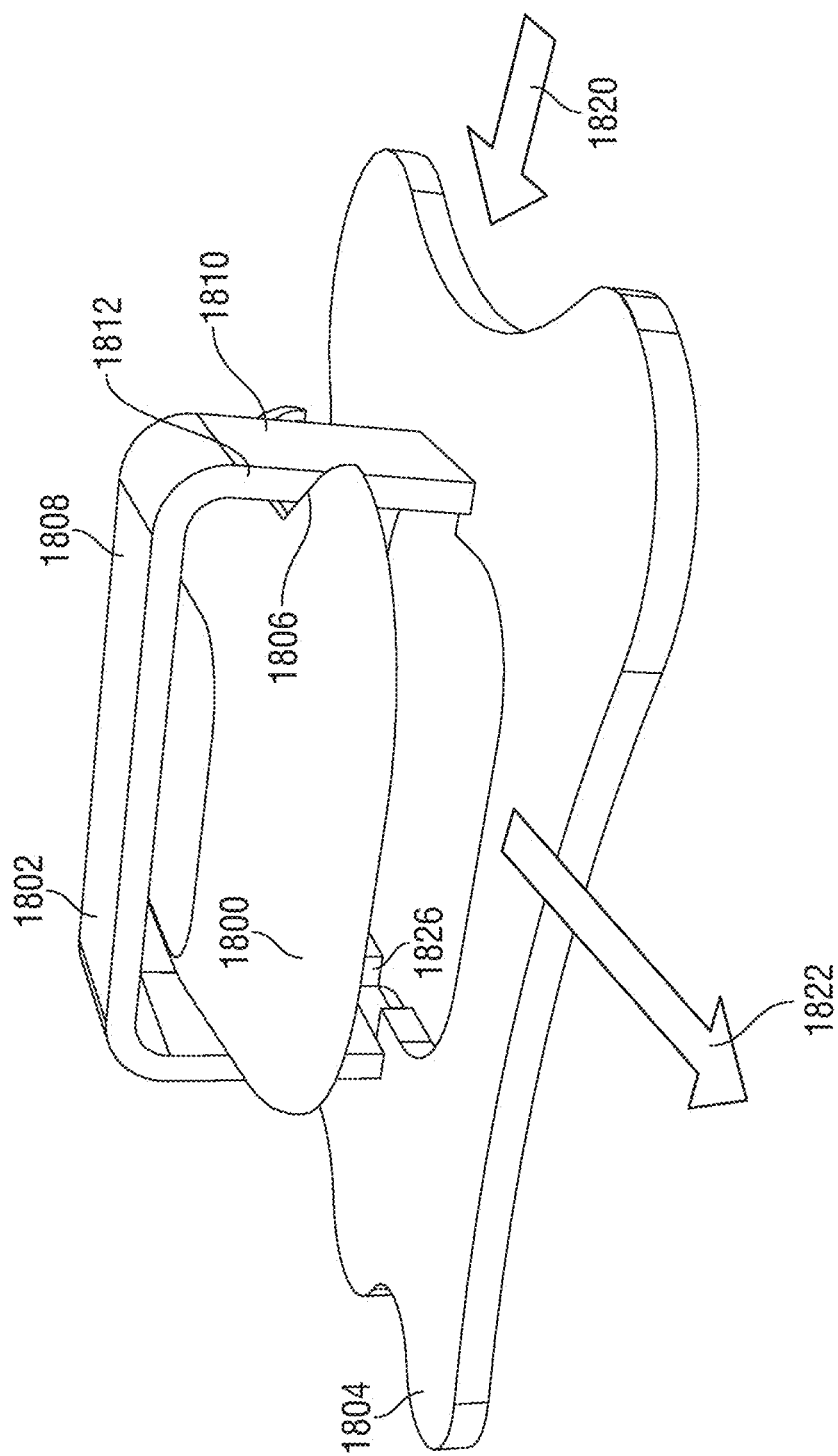
FIG. 18A is a top perspective view of a rectangular captive valve having a securement strap according to an illustrative embodiment.
Figure 18B:
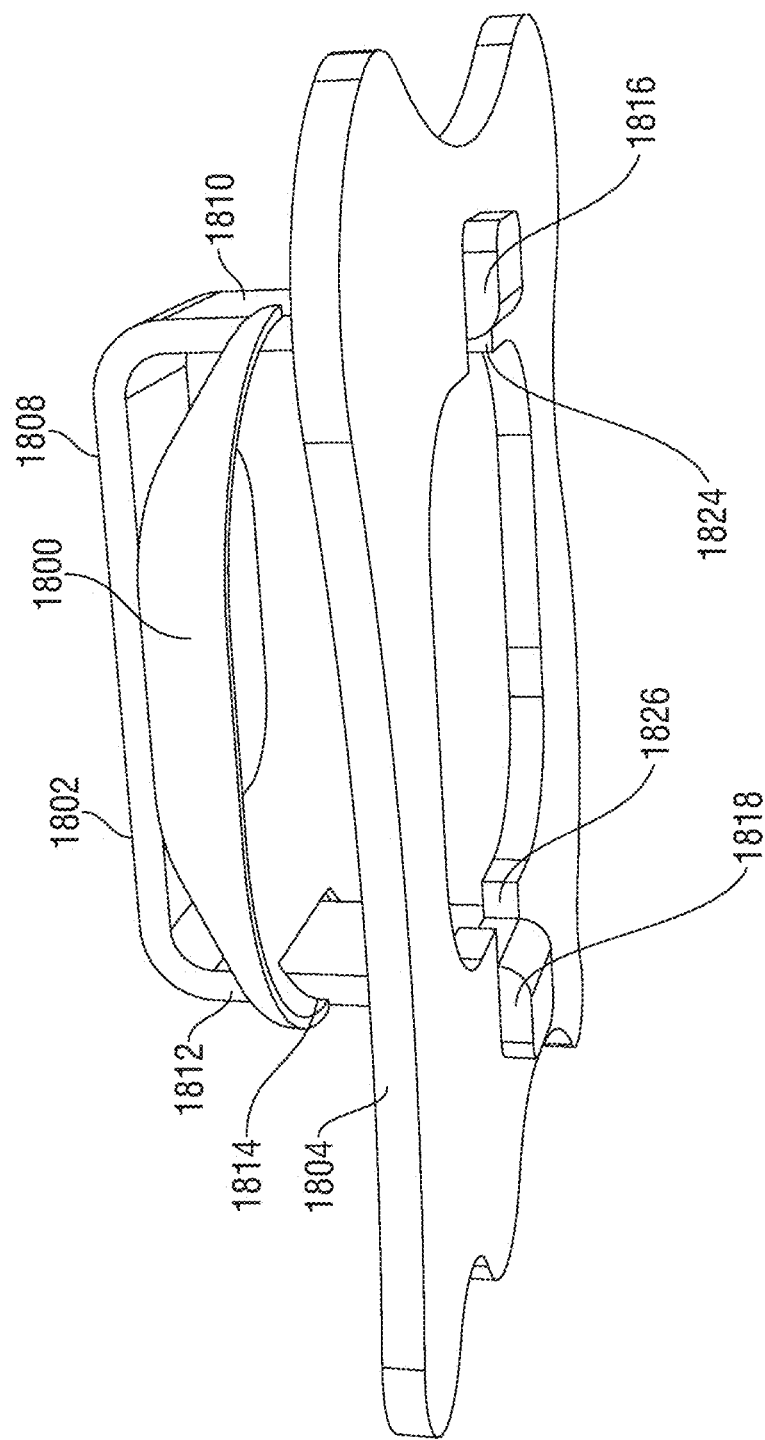
FIG. 18B is a bottom perspective view of the valve of FIG. 18A.

FIG. 18A is a top perspective view of a rectangular captive valve 1800 having a securement strap 1802 coupled thereto. FIG. 18B is a bottom perspective view of the valve 1800. Referring to FIGS. 18A-18B collectively, the valve 1800 is dome shaped and is free to move on an approximate vertical axis towards and away from an associated aperture formed in a tray. In a typical embodiment, the valve 1800 has a depth of approximately 6 millimeters to approximately 12 millimeters; however, in other embodiments, valves of differing depths could be utilized. The strap 1802 extends over a top of the valve 1800 and restricts vertical travel of the valve 1800. The strap 1802 includes a top section 1808, a first leg 1810, and a second leg 1812. A first notch 1806 and a second notch 1814 are formed in an edge of the valve 1800. The first notch 1806 and the second notch 1814 receive the first leg 1810 and the second leg 1812, respectively. Interaction of the first leg 1810 and the second leg 1812 with the first notch 1806 and the second notch 1814, respectively, prevents rotation or lateral movement of the valve 1800. In a typical embodiment, a first tab 1816 extends downwardly from a bottom of the first leg 1810 and a second tab 1818 extends downwardly from a bottom of the second leg 1812. The first tab 1816 is received into a first slot 1824 formed in the tray 1804 adjacent the aperture and the second tab 1818 is received into a second slot 1826 formed in the tray 1804 opposite the first slot 1824. Upon receipt of the first tab 1816 and the second tab 1818 into the first slot 1824 and the second slot 1826, respectively, the first tab 1816 and the second tab 1818 may be bent outwardly to secure the strap 1802 to the tray 1804.

Still referring to FIGS. 18A-18B, the first leg 1810 and the second leg 1812 are arranged are placed generally parallel to a direction of flow of a heavier fluid across the tray 1804 (illustrated by arrow 1820). In a typical embodiment, the first leg 1810 and the second leg 1812 block egress of a lighter fluid from the area under the valve 1800 (illustrated by arrow 1822). The lighter fluid 1822 thus exits the valve 1800 in a direction generally perpendicular to the flow of the heavier fluid 1820. In this manner, intimate mixing and mass transfer between the heavier fluid 1820 and the lighter fluid 1822 is promoted.

Although various embodiments of the method and system of the present disclosure have been illustrated in the accompanying Drawings and described in the foregoing Specification, it will be understood that the disclosure is not limited to the embodiments disclosed, but is capable of numerous rearrangements, modifications, and substitutions without departing from the spirit and scope of the disclosure as set forth herein. It is intended that the Specification and examples be considered as illustrative only.

What is claimed is:
1. A valve tray for use in a chemical-process column, the valve tray comprising:
a tray surface having at least one aperture formed therein, the at least one aperture being of an aperture area;

a retaining cage disposed on the tray surface proximate the at least one aperture, the retaining cage comprising:
an upper portion; and
a leg extending downwardly from the upper portion and coupled to the tray surface proximate the at least one aperture;
a valve cover disposed in the retaining cage, the valve cover comprising:
a top surface having a surface area;
a vane extending around an edge of the top surface, the vane being a continuous circumferential vane that extends outwardly and downwardly from the top surface at a uniform angle continuously around the top surface; and
a notch formed in the vane, the notch defined by oppositely-disposed edges, the oppositely-disposed edges being on opposite sides of the leg and extending inwardly from a perimeter of the vane towards an interior of the valve cover, the notch receiving the leg and being sized such that rotation of the valve cover relative to the leg is constrained,
wherein the aperture area is smaller than the surface area, and
wherein a width of the notch is approximately a same size as a width of the leg.

2. The valve tray of claim 1, wherein the retaining cage allows the valve cover to float vertically relative to the at least one aperture.

3. The valve tray of claim 1, wherein the leg comprises a pair of legs.

4. The valve tray of claim 1, wherein the leg comprises a tab that extends below the tray surface.

5. The valve tray of claim 1, wherein the leg is formed integral with the upper portion of the retaining cage.

6. A valve tray for use in a chemical-process column, the valve tray comprising:
a tray surface having at least one aperture formed therein, the at least one aperture being of an aperture area;
a retaining cage disposed on the tray surface proximate the at least one aperture, the retaining cage comprising:
as an upper portion, a strap extending over a top surface of a valve cover and restricting vertical travel of the valve cover;
a first leg and a second leg extending downwardly from the upper portion and coupled to the tray surface proximate the at least one aperture; and
the valve cover disposed in the retaining cage, the valve cover comprising:
the top surface having a surface area;
a vane extending around an edge of the top surface, the vane being a continuous circumferential vane that extends outwardly and downwardly from the top surface at a uniform angle continuously around the top surface,
wherein the valve cover comprises a pair of oppositely disposed notches, each of the oppositely disposed notches defined by oppositely-disposed edges, the oppositely-disposed edges being on opposite sides of one of the first leg and the second leg, one of the pair of oppositely disposed notches receiving the first leg and the other receiving the second leg, each notch of the pair of oppositely disposed notches being sized such that rotation of the valve cover relative to the legs is constrained,
wherein the aperture area is smaller than the surface area, and
wherein a width of each notch of the pair of oppositely disposed notches is approximately a same size as a width of the respective one of the first leg and the second leg that is received by the notch.

7. The valve tray of claim 6, wherein the first leg and the second leg are each formed integral with the upper portion of the retaining cage.

8. A valve tray for use in a chemical-process column, the valve tray comprising:
a tray surface having at least one aperture formed therein, the at least one aperture being of an aperture area;
a retaining cage disposed on the tray surface proximate the at least one aperture, the retaining cage comprising:
as an upper portion, a strap extending over a top surface of a valve cover and restricting vertical travel of the valve cover;
a first leg and a second leg extending downwardly from the upper portion and coupled to the tray surface proximate the at least one aperture, the first leg and the second leg being placed generally parallel to a direction of flow of a heavier fluid across the tray; and
the valve cover disposed in the retaining cage, the valve cover comprising:
the top surface having a surface area;
a vane extending around an edge of the top surface, the vane being a continuous circumferential vane that extends outwardly and downwardly from the top surface at a uniform angle continuously around the top surface;
a notch formed in the vane, the notch defined by oppositely-disposed edges, the oppositely-disposed edges being on opposite sides of one of the first leg and the second leg and extending inwardly from a perimeter of the vane towards an interior of the valve cover, the notch receiving the one of the first leg and the second leg and being sized such that rotation of the valve cover relative to the one of the first leg and the second leg is constrained,
wherein the aperture area is smaller than the surface area, and
wherein a width of the notch is approximately a same size as a width of the one of the first leg and the second leg that is received by the notch.

9. The valve tray of claim 8, wherein the first leg and the second leg are each formed integral with the upper portion of the retaining cage.

* * * * *